United States Patent
Cho et al.

(10) Patent No.: US 9,986,291 B2
(45) Date of Patent: May 29, 2018

(54) CONTENT REPRODUCTION METHOD AND DEVICE

(71) Applicant: LG ELECTRONICS INC., Seoul (KR)

(72) Inventors: Sunghyun Cho, Seoul (KR); Jingu Choi, Seoul (KR); Youngjun Jo, Seoul (KR); Soyoung Kim, Seoul (KR); Youngwook Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/904,047

(22) PCT Filed: Jul. 10, 2014

(86) PCT No.: PCT/KR2014/006225
§ 371 (c)(1),
(2) Date: Jan. 8, 2016

(87) PCT Pub. No.: WO2015/005708
PCT Pub. Date: Jan. 15, 2015

(65) Prior Publication Data
US 2016/0173947 A1 Jun. 16, 2016

Related U.S. Application Data

(60) Provisional application No. 61/844,828, filed on Jul. 10, 2013, provisional application No. 61/871,834, (Continued)

(51) Int. Cl.
*H04N 7/167* (2011.01)
*H04N 21/4627* (2011.01)
(Continued)

(52) U.S. Cl.
CPC ......... *H04N 21/4627* (2013.01); *G06F 21/00* (2013.01); *H04N 21/2541* (2013.01);
(Continued)

(58) Field of Classification Search
CPC combination set(s) only.
See application file for complete search history.

(56) References Cited

U.S. PATENT DOCUMENTS

| 6,772,331 | B1 | 8/2004 | Hind et al. |
| 8,346,807 | B1 * | 1/2013 | Diamond ............... G06F 21/10 707/781 |

(Continued)

FOREIGN PATENT DOCUMENTS

| KR | 10-2001-0114272 A | 12/2001 |
| KR | 10-2010-0022953 A | 3/2010 |

(Continued)

*Primary Examiner* — Alexander Gee
(74) *Attorney, Agent, or Firm* — Birch, Stewart, Kolasch & Birch, LLP

(57) ABSTRACT

A method for managing license information for playback of content, includes transmitting certificate information of a storage device to a license serve, updating a certificate revision list received from the license server on the basis of the certificate information, receiving encrypted license information allowing the content to be played through a first session established between the storage device and the license server, the first session being identified by session identification information, and decrypting the encrypted license information and storing the decrypted license information to a secure region.

8 Claims, 28 Drawing Sheets

Related U.S. Application Data filed on Aug. 29, 2013, provisional application No. 61/885,503, filed on Oct. 2, 2013, provisional application No. 61/894,894, filed on Oct. 23, 2013, provisional application No. 61/908,753, filed on Nov. 26, 2013.

(51) Int. Cl.

| | |
|---|---|
| *H04N 21/4405* | (2011.01) |
| *H04N 21/835* | (2011.01) |
| *G06F 21/00* | (2013.01) |
| *H04N 21/258* | (2011.01) |
| *H04N 21/254* | (2011.01) |
| *H04N 21/418* | (2011.01) |
| *H04N 21/433* | (2011.01) |
| *H04N 21/6334* | (2011.01) |

(52) U.S. Cl.
CPC . *H04N 21/25816* (2013.01); *H04N 21/25858* (2013.01); *H04N 21/4184* (2013.01); *H04N 21/433* (2013.01); *H04N 21/4405* (2013.01); *H04N 21/6334* (2013.01); *H04N 21/835* (2013.01)

(56) References Cited

U.S. PATENT DOCUMENTS

| | | | |
|---|---|---|---|
| 2001/0039659 A1* | 11/2001 | Simmons | H04N 7/17336 725/61 |
| 2008/0040283 A1* | 2/2008 | Morris | G06F 21/10 705/59 |
| 2008/0289050 A1* | 11/2008 | Kawamoto | G06F 21/10 726/28 |
| 2008/0294894 A1* | 11/2008 | Dubhashi | H04L 9/3271 713/168 |
| 2012/0013945 A1* | 1/2012 | Suzuki | H04N 1/32771 358/1.15 |
| 2012/0079606 A1* | 3/2012 | Evans | G06F 21/10 726/28 |
| 2012/0120250 A1 | 5/2012 | Shintani et al. | |
| 2012/0124678 A1* | 5/2012 | Shintani | G06Q 30/0251 726/29 |

FOREIGN PATENT DOCUMENTS

| | | |
|---|---|---|
| KR | 10-2011-0069381 A | 6/2011 |
| KR | 10-2011-0085156 A | 7/2011 |
| KR | 10-2013-0064131 A | 6/2013 |

\* cited by examiner

FIG. 12

| Location Section(1210) | License Server Location Information(1211) |
| | Retailer Location Information(1212) |
| | Other Information(1213) |
| Asset Information Section(1220) | Secure Level Information (1221) |
| | Media Profile Information(1222) |
| | Asset Identification Information(1223) |
| Meta Data Section(1230) | Meta Data Key Identification Information(1231) |
| | Sample Number Information(1232) |
| | Size Information(1233) |

FIG. 13

| Level | Content Level (1310) | Video Profile (1311) Codec, Profile, Resolution | Audio Profile (1313) | Device Level (1320) |
|---|---|---|---|---|
| 1 | SD | H.264, Profile1, 480 | Profile1 | Content Playback Function(level 1) Copy/Move/Delete Function(level 1) |
| 2 | HD | H.264, Profile2, 1080 | Profile2 | Content Playback Function(level 1, 2) Copy/Move/Delete Function(level 1, 2) |
| 3 | UHD | H.265, Profile3, 1440 | Profile3 | Content Playback Function(level 1, 2, 3) Copy/Move/Delete Function(level 1, 2, 3) |

CONTENT REPRODUCTION METHOD AND DEVICE

CROSS REFERENCE TO RELATED APPLICATIONS

This application is the National Phase of PCT/KR2014/006225 filed on Jul. 10, 2014, which claims priority under 35 U.S.C. 119(e) to U.S. Provisional Application No. 61/844,828 filed on Jul. 10, 2013, U.S. Provisional Application No. 61/871,834 filed on Aug. 29, 2013, U.S. Provisional Application No. 61/885,503 filed on Oct. 2, 2013, U.S. Provisional Application No. 61/894,894 filed on Oct. 23, 2013, and U.S. Provisional Application No. 61/908,753 filed on Nov. 26, 2013, all of which are hereby expressly incorporated by reference into the present application.

TECHNICAL FIELD

The present invention relates to a method and device for playing content and, more particularly, to a method and device for playing content stored in a storage device in an appliance constituting a network service or playing content transmitted through an external device or an Internet server. The present invention also relates to a method and device for managing license information for playback of content.

BACKGROUND ART

Recently, as smartphones and smart TVs have adopted ultra-high definition (UHD) technology beyond full HD, various types of full HD or UHD content are anticipated to be encountered in several fields such as movie, concerts, and sports, as well as air channel broadcasting in the future.

However, if existing playback devices are not able to play various types of full HD and UHD content, users cannot use such content. Thus, playback devices are required to play full HD and UHD content, and a scheme enabling even an existing playback device to play such content may be required.

In order to play HD content, users need to be authorized to do it, and in order to more effectively manage HD content, a method for managing HD content may be required. Also, in order to properly distribute and use HD content, a method for preventing copying may be required and a method for managing license information for playback of HD content may also be required.

DISCLOSURE

Technical Problem

Therefore, an aspect of the present invention is to define a system architecture including configuration of a device for playing secure high definition (HD) content, configuration of a network, and a transmission protocol between a server and a device.

Another aspect of the present invention is to define a content directory structure and a file format to effectively manage secure high definition content data.

Another aspect of the present invention is to provide a method and system for obtaining and managing license information for playing secure high definition content.

Another aspect of the present invention is to define a session for transmitting information between devices in a system for playing secure high definition content.

Another aspect of the present invention is to provide a method for playing secure high definition content using near-field communication (NFC) between devices.

Technical Solution

According to an aspect of the present invention, there is provided a system architecture including configuration of a device for playing secure high definition content, configuration of a network, and a transmission protocol between a server and a device.

According to an aspect of the present invention, there are provided a content directory structure and a file format to effectively manage secure high definition content data.

According to an aspect of the present invention, there is provided a method for obtaining license information for playing secure high definition content.

According to an aspect of the present invention, there is provided a method for defining a session for transmitting between devices in a system for playing secure high definition content.

According to an aspect of the present invention, there is provided a method for playing secure high definition content by using NFC between devices.

Advantageous Effects

According to embodiments of the present invention, even though a user device is connected to a storage device storing a format or a profile not supported by the user device, a user may play high definition (HD) or ultra-high definition (UHD) content by automatically searching and/or downloading an alternative content file through the Internet that may be played in the user device.

Thus, even when the user cannot play content stored in a storage device by a user device, the user does not have to perform a cumbersome procedure such as directly accessing a download server to search for content, or selecting the searched content and downloading the selected content.

Also, even though a playback device has poor performance, the user may search for alternative content and play the content, whereby the user may be provided with various content services.

Also, since the directory structure and file format of HD content are provided, secure HDD content data may be effectively managed and played.

Also, since license information of HD content is obtained from a license server, a function may be added to an existing certified device without having to be certified additionally, and HD content may be used by interworking with the additional function.

Also, since the playback device periodically checks the right to play, a strengthened license management function with respect to playback of HD content may be provided.

DESCRIPTION OF DRAWINGS

FIGS. 11 and 12 illustrate formats of HD content to which the present invention is applied, according to embodiments to which the present invention is applied.

FIG. 13 is a view illustrating a level of HD content and a level of a playback device for playing the HD content to which the present invention is applied according to an embodiment to which the present invention is applied.

FIGS. 22 and 23 are views illustrating embodiments to which the present invention is applied, in which FIG. 22 is a block diagram illustrating establishment of a session between a license server and a plurality of storage devices through a single playback device, and FIG. 23 is a block diagram illustrating establishment of a session between a retailer and a plurality of storage devices through a single playback device.

FIGS. 24 and 25 are views illustrating embodiments to which the present invention is applied, in which FIG. 24 is a block diagram illustrating establishment of a session between a license server and a plurality of storage devices through a plurality of playback devices, and FIG. 25 is a block diagram illustrating establishment of a session between a retailer and a plurality of storage devices through a plurality of playback devices.

BEST MODES

Figure 1:
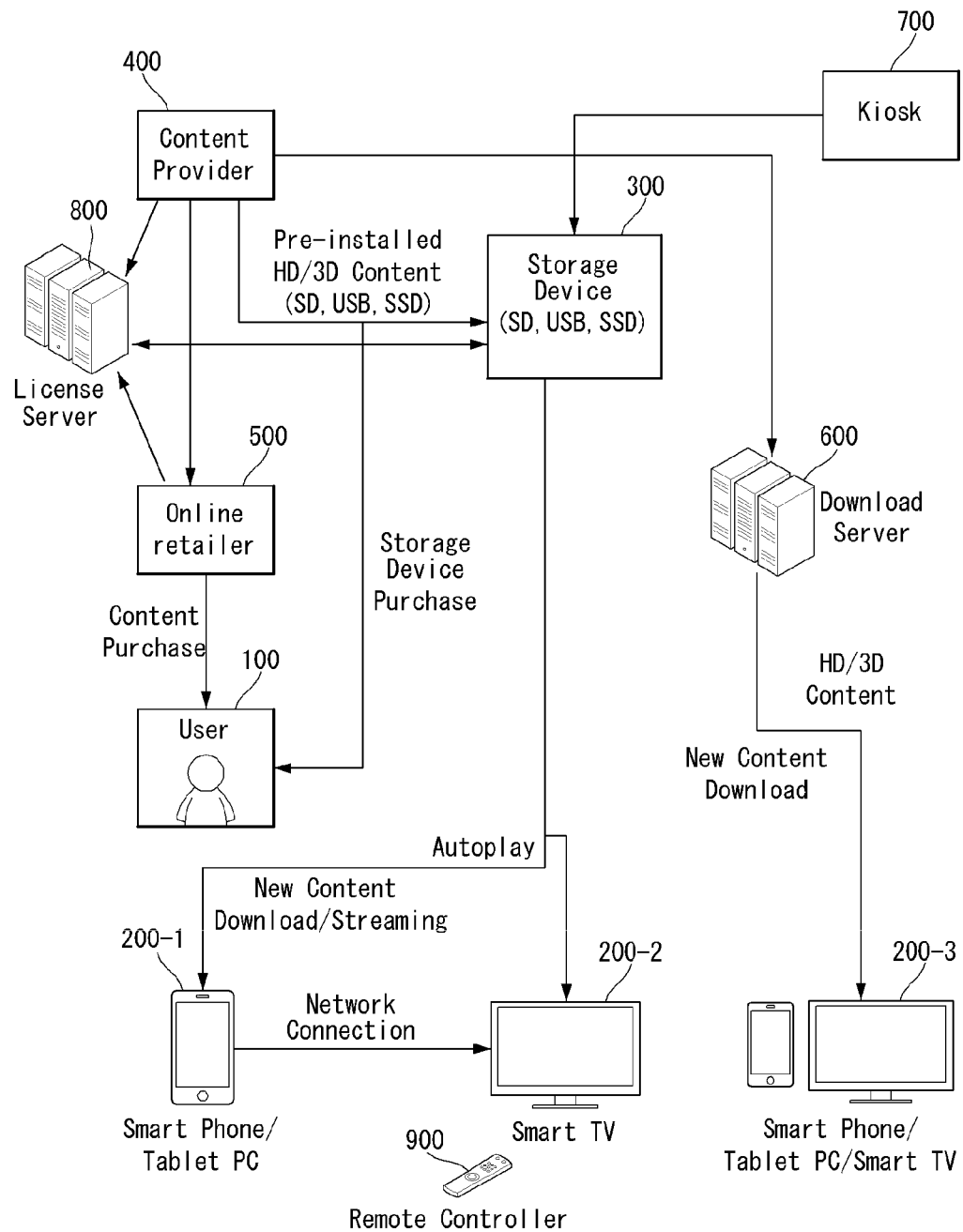
FIG. 1 is a view illustrating a system for using secure high definition content service according to an embodiment to which the present invention is applied.

The present invention provides a method for managing license information for playback of content, including: transmitting certificate information of a storage device to a license server; updating a certificate revision list received from the license server on the basis of the certificate information; receiving encrypted license information allowing the content to be played through a first session established between the storage device and the license server, the first session being identified by session identification information; and decrypting the encrypted license information and storing the decrypted license information to a secure region.

In the present invention, the session identification information may indicate one of at least two types of session statuses, the at least two types of session statuses may include a secure session and a non-secure session, and the first session may correspond to the secure session.

In the present invention, the method may further include: receiving the content from an external server through a second session established between the storage device and the external server, wherein the second session corresponds to the non-secure session.

In the present invention, first session identification information indicating the secure session may be represented as 0x0001, and second session identification information indicating the non-secure session may be represented as 0x0000.

In the present invention, the received content may be stored in a file system of the storage device.

The present invention also provides a storage device of managing license information for playback of content, including: a file system configured to transmit certificate information of the storage device to a license server, and update a certificate revision list received from the license server on the basis of the certificate information; and a secure information management unit configured to receive encrypted license information allowing the content to be played through a first session established between the storage device and the license server, decrypt the encrypted license information, and store the decrypted license information to a secure region, wherein the first session is identified by session identification information.

In the present invention, the file system may store the received content.

The present invention also provides a method of playing content by a playback device, including: transmitting, to a license server, certificate information of a storage device; transmitting, to the storage device, a certificate revision list received from the license server on the basis of the certificate information; obtaining license information allowing the content to be played through a first session established between the playback device and the storage device, the first session being identified by session identification information; and playing the content on the basis of the license information.

In the present invention, the method may further include: receiving the content from an external server through a second session established between the storage device and the external server, wherein the second session corresponds to the non-secure session.

In the present invention, the method may further include: detecting whether the storage device is connected; and transmitting, to the license server, transaction information stored in the detected storage device, wherein the transaction information includes transaction identification information (handle) identifying a corresponding transaction and a user, and the license information is transmitted from the license server to the storage device on the basis of the transaction information.

In the present invention, at least one of the content and the license information includes output control information related to an output control of the content, and the output control information includes HDCP (High-bandwidth Digital Content Protection) control information.

The present invention also provides a playback device of playing a content, including: a controller configured to transmit, to a license server, certificate information of a storage device, transmit, to the storage device, a certificate revision list received from the license server on the basis of the certificate information, obtain license information allowing the content to be played through a first session established between the storage device and the license server, and play the content on the basis of the license information; and a display configured to output the content, wherein the first session is identified by session identification information.

In the present invention, the controller is further configured to detect whether the storage device is connected, transmit, to the license server, transaction information stored in the detected storage device, wherein the transaction information includes transaction identification information (handle) identifying a corresponding transaction and a user, and the license information is transmitted from the license server to the storage device on the basis of the transaction information.

In the present invention, at least one of the content and the license information includes output control information related to an output control of the content, wherein the output control information includes HDCP (High-bandwidth Digital Content Protection) control information.

Mode for Invention

Hereinafter, elements and actions of embodiments of the present invention will be described below in more detail with reference to the accompanying drawings. However, the elements and actions illustrated in the drawings and described with reference thereto are set forth only as examples and do not limit the spirit of the invention or its key elements and actions.

The terms used in this specification were selected to include current, widely-used, general terms. However, in certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

FIG. 1 is a view illustrating a system for using secure high definition content service according to an embodiment to which the present invention is applied.

A system to which the present invention is applied may include a user 100 who purchases secure high definition content and uses the same, playback devices 200-1, 200-2, and 200-3 capable of playing the content, a storage device 300 in which the content has been stored or in which the content may be stored, a content provider 400 providing the content, a retailer 500 and an electronic kiosk 700 receiving the content and providing the received content to the user, and a download server 600 storing the content to allow the content to be downloaded, and a license server 800 providing license information allowing the content to be played. Also, the system may further include an external interface 900, for example, a remote controller, for controlling an operation of the playback devices.

In an embodiment to which the present invention is applied, the user who wants to use a secure high definition (HD) content service may use the service through various methods. The secure HD content may include, for example, secure content storage association (SCSA) content, and content mentioned in this disclosure may include the SCSA content.

In a first example, the user 100 may use the service by purchasing a storage device in which the secure high definition content has already been stored. For example, the content provider 400 may preload content, which is intended to be provided, to a portable hard drive such as a hard disk drive (HDD) or a solid state drive (SSD) or a flash memory product such as a universal serial bus (USB) flash drive or a secure digital (SD) card, and purchase the same, and the user may use the service by purchasing the storage device storing desired content.

In a second example, the user 100 may use the service by purchasing content from a retailer 500 providing the secure high definition content service. For example, the retailer 500 may receive content from the content provider 400 and provide the content service online or offline, and the user 100 may use the service by properly purchasing content from the retailer 500. Also, the user 100 may also use the service by purchasing the storage device from the retailer 500.

In this case, the retailer 500 may provide transaction information corresponding to content purchase to the user 100. Here, the transaction information is information regarding content transaction activity, which may refer to aggregation information of right information.

For example, the transaction information may correspond to one content item purchased by the user, and the right information may be information indicating a status for issuing a license for a storage device. Here, the one content item may include at least one content among SD, HD, UHD version content, and the content of each version is related to one right information.

The transaction information may include at least one of a serial number used for uniquely referring to each transaction, transaction identification information uniquely identifying each transaction, transaction status information indicating a status of a transaction, a transaction generation time information indicating a generation time of a transaction, a transaction identifier list provided by a retailer, a transaction type information identifying a transaction type, and retailer information who has created the right information or the transaction information. Here, the transaction identification information may provide a unique link regarding a corresponding transaction.

In a third example, the user 100 may play the content by inserting the storage device 300 storing secure high definition content into the playback device 200-1. For example, the playback device 200-1 may be any device which may be able to play multimedia content, such as a mobile device, a TV, a computer, a notebook computer, and a tablet PC.

In a fourth example, the user 100 may insert the storage device 300 in which the secure high definition content has been stored or may be stored into the first playback device 200-1, and play the content in the second playback device 200-2. Here, the first playback device 200-1 and the second playback device 200-2 may be connected by a network, and when the storage device 300 is inserted into the first playback device 200-1, power of the second playback device 200-2 may be automatically turned on. Also, content may be played in the second playback device 200-2 through an external interface (for example, the remote controller 800, or the like) or a user interface (for example, a touch screen, a voice, a gesture, and the like).

In a fifth example, the user 100 may insert the storage device 300 capable of storing secure high definition content into the playback device 200-3 and download the content from an external content server to thus play the content. Here, the content may be stored in the storage device 300, and the external content server may be a content server of the content provider 400 or the retailer 500.

In order to play the secure high definition content, a specific application may be required. The specific application mentioned in this disclosure may refer to a software program for playing secure high definition content. For example, the specific application may refer to a software program capable of playing copy-prevented high definition content which has been stored or may be stored in a portable hard drive such as an HDD or SSD or in a flash memory product such as a USE flash drive or an SD card.

In particular, in the case of a playback device unable to reproduce the secure high definition content, installation of the specific application may be essential to play the content.

Figure 2:
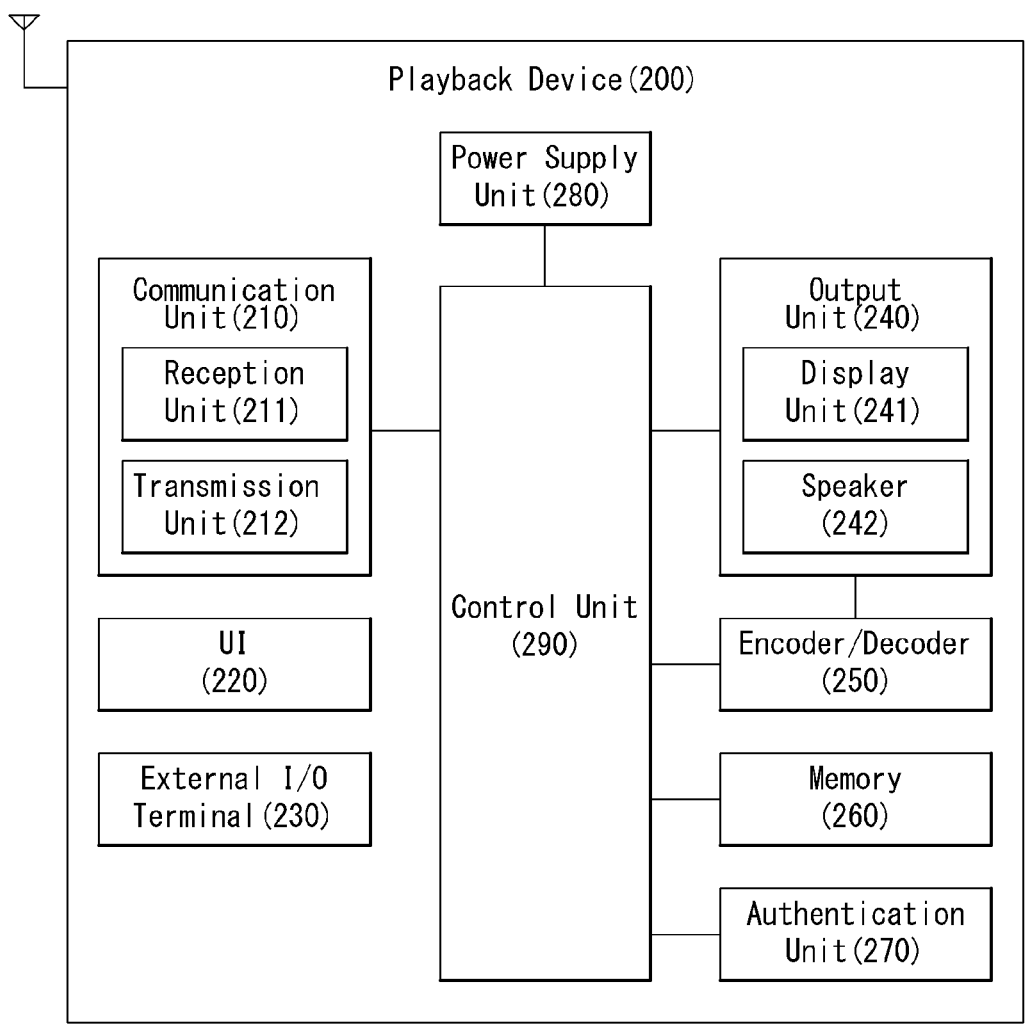
FIG. 2 is a schematic internal block diagram of a playback device for playing secure high definition content service according to an embodiment to which the present invention is applied.

FIG. 2 is a schematic internal block diagram of a playback device for playing secure high definition content service according to an embodiment to which the present invention is applied.

The playback device 200 may include a communication unit 210, a user interface 220, an external input/output terminal 230, an output unit 240, an encoder/decoder 250, a memory 260, a certification unit 270, a power supply unit 280, and a control unit 290. The communication unit 210 may include a reception unit 211 and a transmission unit 212, and the output unit 240 may include a display unit 241 and a speaker 242.

The communication unit 210 may include one or more modules allowing for wired/wireless communication between the playback device 200 and the convent server or between the playback device 200 and other electronic device connected by a network. For example, the reception unit 211 may receive a signal transmitted from the content server or the other electronic device through a channel. Here, the signal may include secure high definition content data. The transmission unit 212 may transmit information required for downloading or streaming the secure high definition content data to the content server or the other electronic device. For example, the information required for downloading or streaming the secure high definition content data may include at least one among identification information, transaction information, license information, level information, and certificate information of the playback device and/or the storage device. Here, the license information may be information allowing purchased content to be played and may include at least one of license file information and license key information, for example.

The user interface 220 serves to transfer input information from the user to the playback device 200. For example, in order to control playing of the secure high definition content, in order to input information required for purchasing or certification procedure, or in order to perform setting for playing in other electronic device, the user interface 220 may be used. The user interface 220 may include a touch screen unit (not shown), a voice recognition unit (not shown), or a gesture recognition unit (not shown), and may be a separate external device such as a remote controller.

The external input/output terminal 230 may serve as a passage with an external device connected to the playback device 200. The external input/output terminal 230 may receive data or power from an external device and transfer the same to each component of the playback device 200, or transmit data within the playback device 200 to an external device. For example, the external input/output terminal 230 may be a connection terminal for connection with the storage device 300 and may include at least one among a USB port, a HDMI port, a wired/wireless headset port, an external charger port, a wired/wireless data port, a memory card port, an audio input/output (I/O) port, a video I/O port, and an earphone port. The storage device 300 and the playback device 200 may communicate through the external input/output terminal 230.

The output unit 240, serving to generate an output related to sight and hearing, may include the display unit 241 and the speaker 242.

The display unit 241 may output visual information processed in the playback device 200. For example, the display unit 241 may output secure high definition content, output information indicating that the storage device 300 has been plugged in, or output information required for a process of purchasing or certifying content. The display unit 241 may include at least one among a liquid crystal display (LCD), a thin film transistor liquid crystal display (TFT LCD), an organic light emitting diode (OLED), a flexible display, and a 3D display.

The speaker 242 may output acoustic information processed in the playback device 200. For example, the speaker 242 may output audio information of content or information required for playing the content, as voice information.

The encoder/decoder 250 may be used to perform decoding to display the secure high definition content or may be used to encode an image signal or an audio signal input from the playback device 200.

The memory 260 may store a program for operation of the control unit 290 or may temporarily store input/output data. For example, the memory 260 may store a specific application for playing the secure high definition content or may store identification information, profile information, level information, and certificate information of the playback device 200 and meta data of the content.

The memory 260 may include at least one type of storage mediums among a flash memory type, a hard disk type, a multimedia card micro-type, a card-type memory (e.g., an SD or XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. Also, the playback device 200 may operate in relation to a Web storage performing a storage function of the memory 260 on the Internet.

The certification unit 270 may decrypt encrypted content to play the content. Here, the certification unit 270 may perform a response checking process regarding key information, and may transmit and receive right information of a storage device or a playback device.

The power supply unit 280 may receive external power and/or internal power and supply power required for operation of each component under the control of the control unit 290.

The control unit 290 controls a general operation of the playback device 200. For example, the control unit 290 may control an operation of detecting whether the storage device 300 is connected, receiving certificate information from the detected storage device, or transmitting the received certificate information to a server. Also, the control unit 290 may control an operation of receiving an encrypted media file and a certificate list (or a certificate revision list (CRL)) from the server on the basis of the certificate information, storing the encrypted media file to the storage device, update the certificate list, or playing the encrypted media file on the basis of the updated certificate list.

Figure 3:
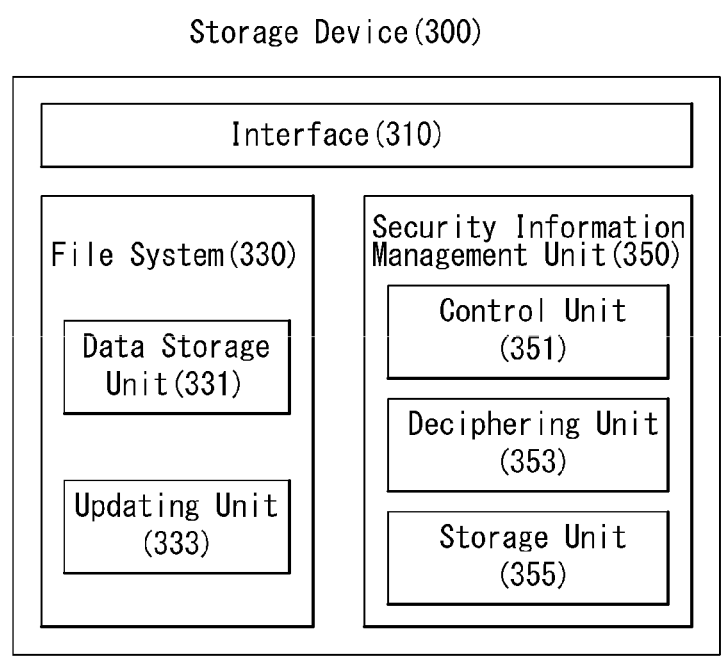
FIG. 3 is a schematic internal block diagram of a storage device for storing secure high definition content service according to an embodiment to which the present invention is applied.

FIG. 3 is a schematic internal block diagram of a storage device for storing secure high definition content service according to an embodiment to which the present invention is applied.

The storage device 300 to which the present invention is applied may include an interface 310, a file system 330, and a secure information management unit 350. The file system 330 may include a data storage unit 331 and an updating unit 333, and the secure information management unit 350 may include a control unit 351, a decryption unit 353, and a storage unit 355.

The interface 310 serves as a passage with an external device connected to the storage device 300. For example, when the storage device 300 is plugged in to a playback device, the storage device 300 may receive data from the playback device or transmit internal data of the storage device 300 to the playback device through the interface 310.

The data storage unit 331 may store license information, password information, and the certificate revision list required for playing the encrypted multimedia content data.

The updating unit 333 may receive the certificate revision list and synchronize the received certificate list with previously stored certificate list, thus updating the certificate list. Here, the certificate revision list may be received from the playback device or an external server.

The secure information management unit 350 may be connected to a license server through the playback device, and may perform a handshake process with the license server regarding the license information, the password information, and the certificate list required for playing content. The control unit 351 of the secure information management unit 350 may control the forgoing process, and the decryption unit 353 may decrypt the license information or the password information. The storage unit 355 may store the license information and/or the password information, and the storage unit 355 may be a secure region within the storage device 300.

Figure 4:
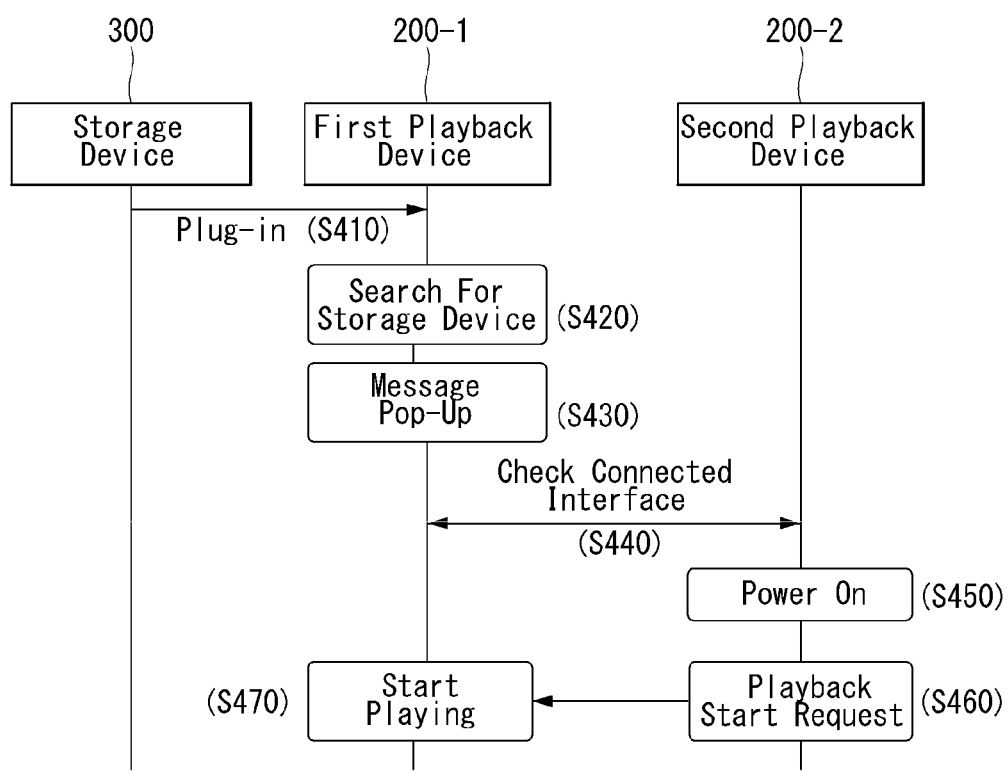
FIG. 4 is a flow chart illustrating a process of automatically turning on power of a second playback device when a storage device is inserted into a first playback device.

FIG. 4 is a flow chart illustrating a process of automatically turning on power of a second playback device when a storage device is inserted into a first playback device.

Referring to FIG. 4, when the storage device 300 storing secure HD content is plugged in to the first playback device 200-1 (S410), the first playback device 200-1 may automatically search for the plugged-in device, and identify the storage device 300 according to the search result (S420).

When the playback device 200-1 identifies the plugged-in storage device 300, the first playback device 200-1 may display notification information indicating that the storage device 300 has been plugged in, and here, the notification information may be output as a pop-up message (S430). The first playback device 200-1 may display a content list included in the storage device 300, and content to be played may be selected through communication (media browse) with an input device.

Also, when the playback device 200-1 identifies the plugged-in storage device 300, the first playback device 200-1 may identify a different playback device connected thereto and check a connection interface with the different playback device (S440). For example, the first playback device 200-1 may be a media player, the second playback device 200-2 may be a TV, and the first playback device 200-1 and the second playback device 200-2 may be connected through a wired/wireless interface such as high definition multimedia interface (HDMI), a wake-on LAN, or Bluetooth.

Meanwhile, when the first playback device 200-1 checks the connection interface with the second playback device 200-2, power of the second playback device 200-2 may be automatically turned on (S450). When playing of corresponding content is requested through the second playback device 200-2 (S460), the first playback device 200-1 may play the content (S470). Here, the first playback device 200-1 may play the content according to the play start request of an external input device, and the content may be selected from the display content list.

Figure 5:
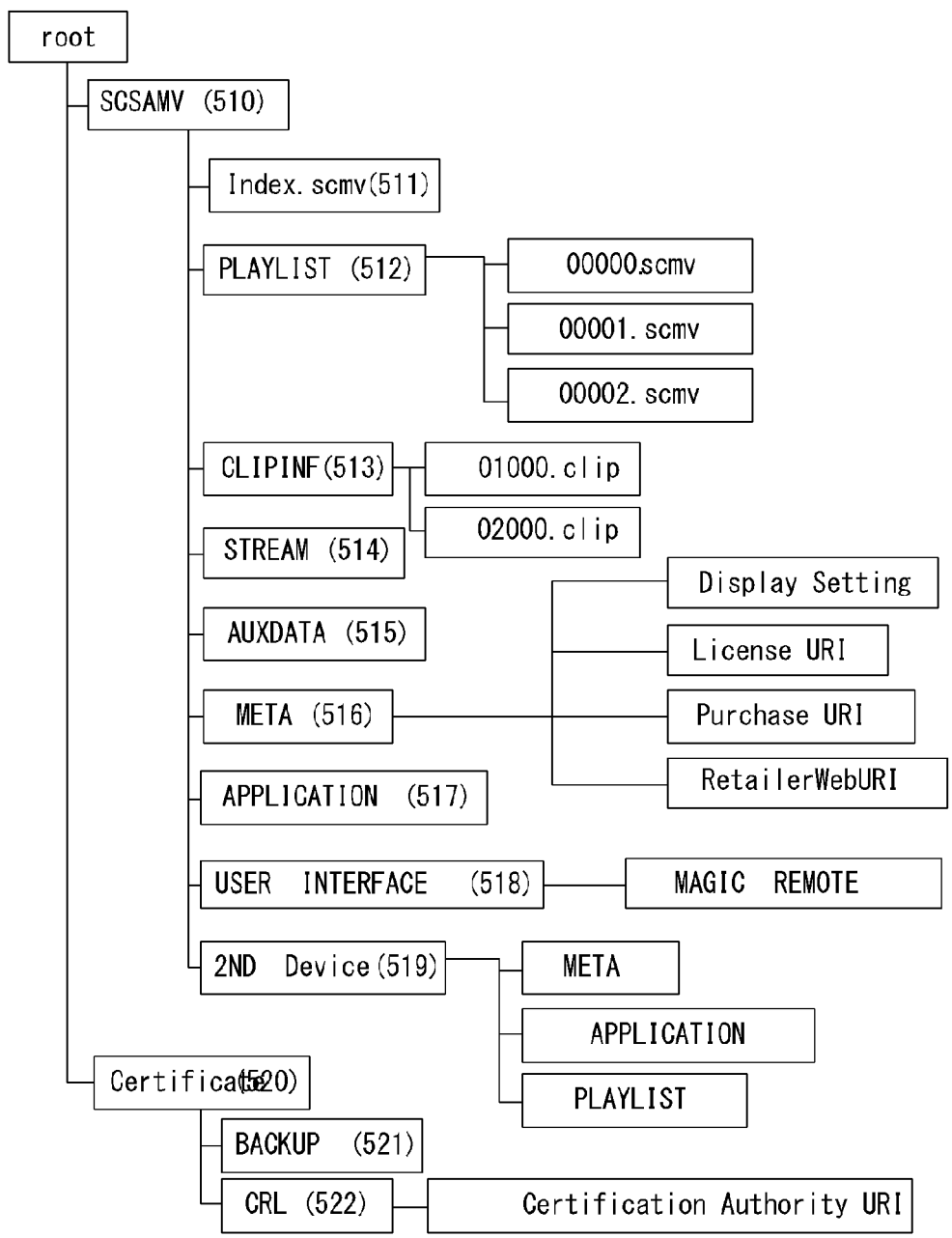
FIG. 5 is a view illustrating a data directory structure for managing HD content to which the present invention is applied, according to an embodiment to which the present invention is applied.

FIG. 5 is a view illustrating a data directory structure for managing HD content to which the present invention is applied, according to an embodiment to which the present invention is applied.

The data directory structure for managing HD content may be divided into a HD content image directory (SC-SAMV) 510 and a certificate directory 520 from a root directory.

The HD content image directory 510 may include an index directory 511, a play list directory 512, a clip directory 513, a stream directory 514, an additional data directory 515, a meta data directory 516, an application directory 517, a user interface directory 518, and a second device directory 519. The play list directory 512 may include play items such as 00000.scmv, 00001.scmv, and 00002.scmv.

The clip directory 513 may include clip items such as 01000.clip and 02000.clip.

The meta data directory 516 may include information such as display setting, license uniform resource locator (URI), a purchase URI, and a retailer URI. For example, the meta data directory 516 may include movie advertisement information, retailer information, and display setting information. Here, the movie advertisement information may include a license URI, a purchase URI, and the retailer information may include a retailer name and a Web site URI.

The display setting information may include brightness, contrast, gamma, frame rate, and color depth information according to display mode information (for example, movie, sports, drama, and music).

The user interface directory 518 may include information regarding a separate external input device. The second device directory 519 may include meta data of the second device, an application of the second device, and a play list of the second device. For example, the meta data of the second device may include information of a clip name, a play time, a director, and an actor, the application of the second device may include information of a platform, a name, and an installation URI, and the play list of the second device may include information of a play start time, a play end time, an object type, an object file or an object address, description information of a corresponding object, an execution command.

Meanwhile, the certificate directory 520 may include a backup 521 and a certificate list 522, and the certificate list 522 may include certification right address information, playback device certificate information, and storage device certificate information.

Figure 6:
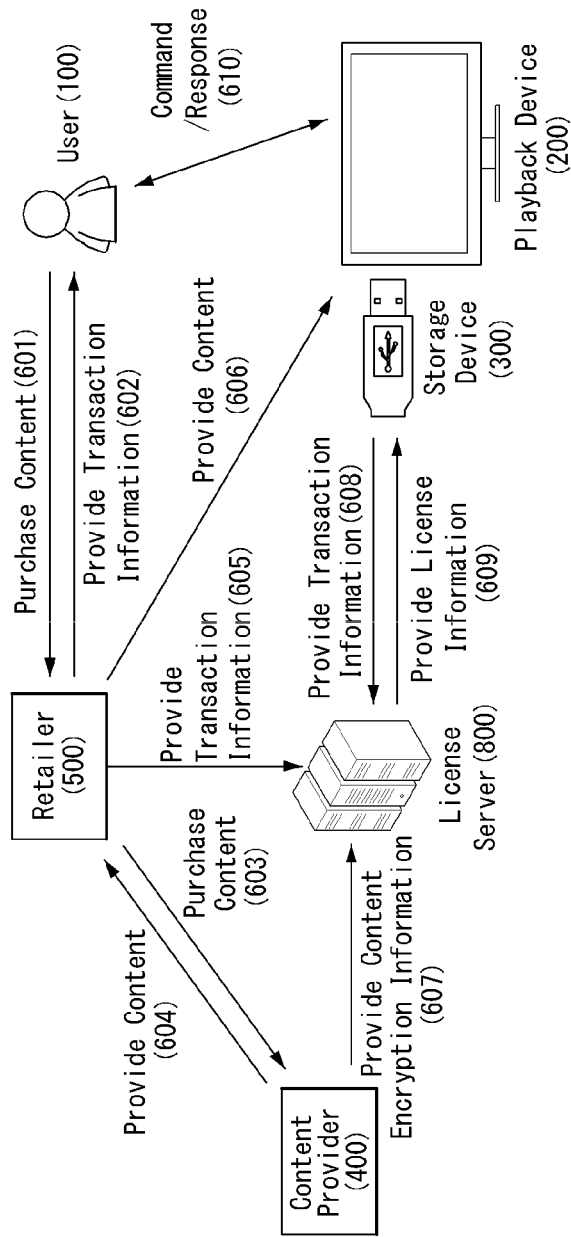
FIG. 6 is a view illustrating a network system structure for obtaining license information for playing secure HD content stored in a storage device.

FIG. 6 is a view illustrating a network system structure for obtaining license information for playing secure HD content stored in a storage device.

In order for the user to purchase HD content and play it in a playback device, the user needs to obtain at least one of transaction information and license information corresponding to the HD content. Here, the transaction information refers to information regarding a content transaction activity, which may refer to aggregation information of right information. The transaction information and the right information are the same as those described above with reference to FIG. 1. The license information is information allowing purchased content to be played and may include at least one of license file information and license key information, for example.

In the present embodiment, a process of obtaining license information to play HD content will be described.

Referring to FIG. 6, the user 100 may purchase secure HD content from the retailer 500 (601). In the present embodiment, the retailer 500 is taken as an example, but content may also be purchased through any other route or other content retainer, for example, the content provider 400 or other user.

The retailer 500 may also request content purchase from the content provider 400 or another retailer 500 (603), and may be provided with content therefrom (604).

Upon receiving the purchase request from the user 100, the retailer 500 may provide the right to play HD content to the user through generation of transaction information. For example, the retailer 500 may provide transaction information to the user 100 (602), and provide transaction details to the license server 800 (605). Here, the provided transaction information may be stored in the storage device 300 and may correspond to one HD content. The HD content may be provided as content of a plurality of versions, and may be provided as one or more of SD, HD, UHD class content. Also, the retailer 500 may provide HD content to the storage device 300 (606).

The license server 800 may include an interface and data required for determining whether the storage device has the right to play content. The license server 800 may receive the transaction details from the retailer 500, receive content code information from the content provider 400 (607), and receive the transaction information from the storage device 300 (608).

The license server 800 may generate transaction information on the basis of the transaction details. Also, the transaction information may be generated by the retailer 500.

Meanwhile, the user 100 may request the playback device 200 to play the purchased HD content through an interface. Here, the transaction information stored in the storage device 300 may be transmitted to the license server 800, and the license server 800 may check whether there is right to play on the basis of the transaction information. When it is checked that there is right to play, the license server 800 may generate right information and license information and transmit the generated right information and license information to the storage device 300 (609). Here, the license information is information allowing the purchased content to be played, and may include at least one of license file information and license key information.

Upon receiving the right information and the license information, the storage device 300 may play the HD content.

Figure 7:
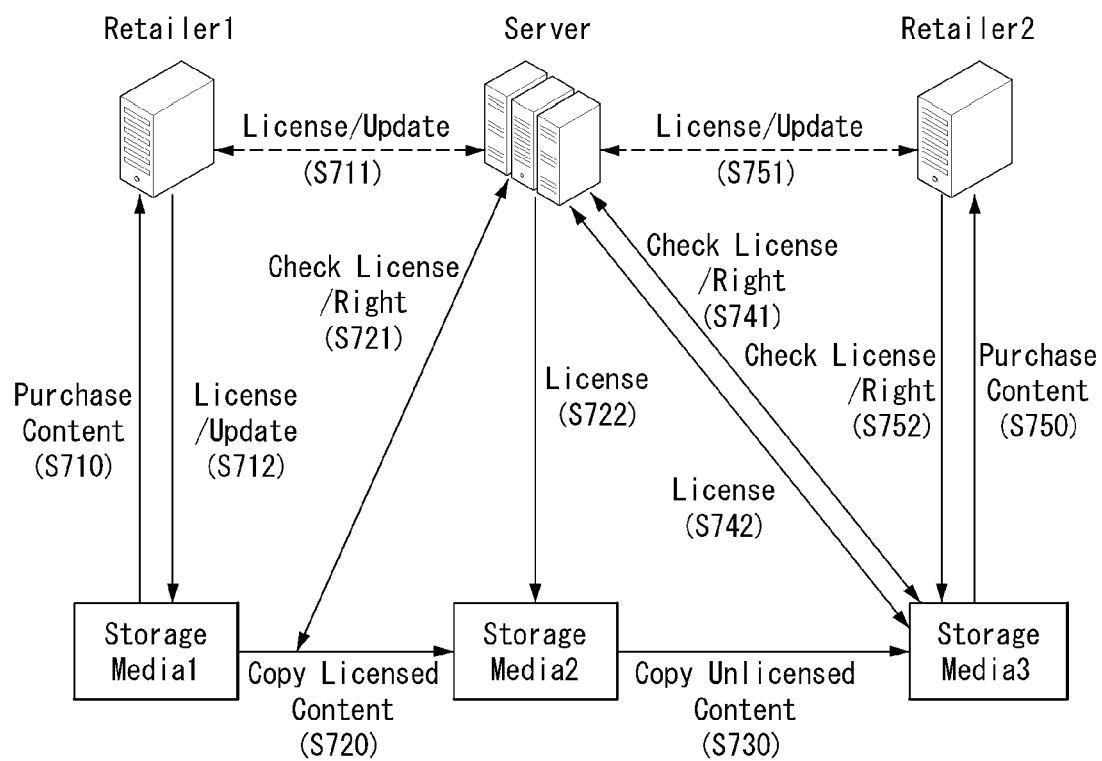
FIG. 7 is a flow chart illustrating a process of licensed copying and unlicensed copying of secure HD content between storage devices according to an embodiment to which the present invention is applied.

FIG. 7 is a flow chart illustrating a process of licensed copying and unlicensed copying of secure HD content between storage devices according to an embodiment to which the present invention is applied.

The secure HD content may be copied or moved from one storage device to another storage device. Here, the license server may provide the right for valid copying or movement.

First, when a storage media 1 purchases secure high definition content from a retailer 1 (S710), the retailer 1 may report contents of the content purchase to a server. Here, the server may refer to a license server. The server may provide a valid license regarding the content purchase to the retailer 1, and update a certificate list stored in the server (S711). Here, the certificate list may include at least one of a content title certificate list, a storage device certificate list, a playback device certificate list, and a license certificate list.

The retailer 1 may provide a valid license regarding the content purchase to the storage media 1, and update the certificate list stored in the retailer 1 (S712).

In another embodiment, in a case in which content properly purchased from the storage media 1 is intended to be copied to a storage media 2 (S720), the server may determine whether the storage media 2 has authority to play the content or whether the content may be copied (S721). When the storage media 2 has authority to play the content or the content may be copied according to the determination, copying of the content by the storage media 2 may be performed and the server may provide license information for playing the content to the storage media 2 (S722). Here, the storage media 2 may need to have capability of playing the content.

In another embodiment, when the content is intended to be copied invalidly (unlicensed copy) from the storage media 2 to a storage media 3 (S720), only a data file of the content may be copied from the storage media 2 to the storage media 3 and a certification procedure through the server is not performed (S730). However, when the storage media 3 intends to play the content, a new license may need to be issued.

In another embodiment, when the storage media 3 intends to play the content, the storage media 3 may request the right to play the content from the server (S741), and accordingly, the server may provide the right to play the content to the storage media 3 (S742).

However, when the right to play the content expires, the storage media 3 should newly purchase content from the retailer 2 (S750). When purchasing new content through the retailer 2 is completed, the retailer 2 may transmit the purchase information to the server and the server may update the certificate list stored in the server on the basis of the new purchase information (S751). The retailer 2 may provide a valid license regarding the content purchase to the storage media 3, and update a certificate list stored in the retailer 2 (S752).

Figure 8:
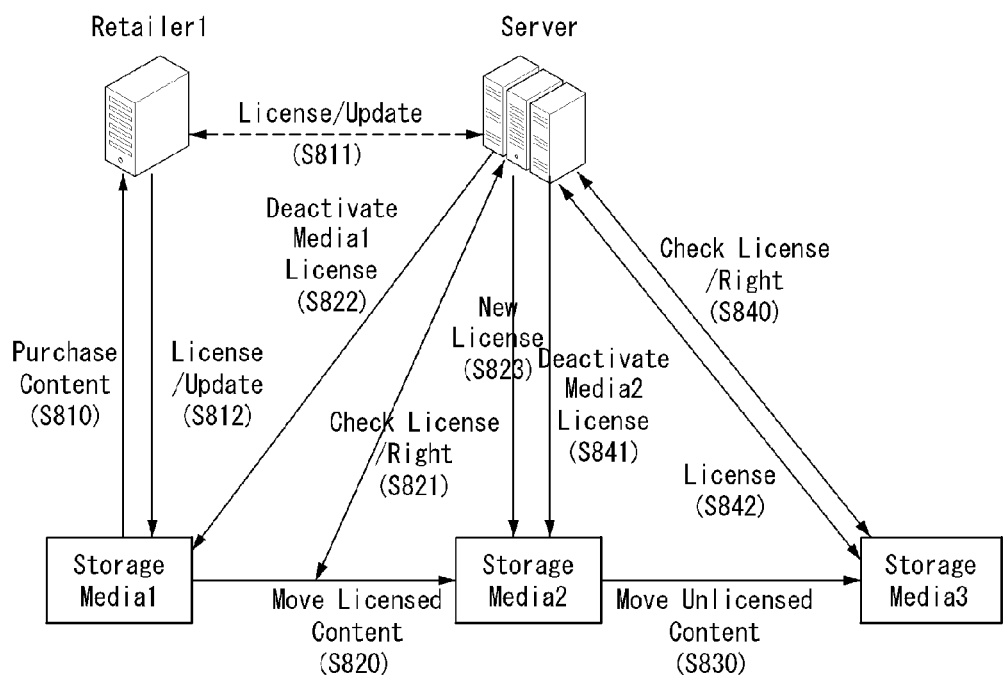
FIG. 8 is a flow chart illustrating a process of licensed moving and unlicensed moving of secure HD content between storage devices according to an embodiment to which the present invention is applied.

FIG. 8 is a flow chart illustrating a process of licensed moving and unlicensed moving of secure HD content between storage devices according to an embodiment to which the present invention is applied.

The secure high definition content may be moved from one storage device to other storage device. Here, movement may refer to transfer of a content file to a destination storage media having an activated license. The movement may be performed by a playback device having capability of playing the secure high definition content. The destination storage media may be able to store the secure high definition content. Here, the server may provide the right to move content validly.

First, when the storage media 1 purchases secure high definition content from the retailer 1 (S810), the retailer 1 may report contents of the content purchase to the server. The server may provide a valid license regarding the content purchase to the retailer 1, and update a certificate list stored in the server (S811). Here, the certificate list may include at least one of a content title certificate list, a storage device certificate list, a playback device certificate list, and a license certificate list.

The retailer 1 may provide a valid license regarding the content purchase to the storage media 1, and update the certificate list stored in the retailer 1 (S812).

In another embodiment, in a case in which content properly purchased from the storage media 1 is intended to be moved to the storage media 2 (S820), the server may determine whether the storage media 2 has the right to move the content or whether the content may be copied (S821). When the storage media 2 has the right to move the content or the content may be moved according to the determination, movement of the content by the storage media 2 may be performed and the server may deactivate the license which has been provided to the storage media 1 (S822), and provide new license information for playing the content to the storage media 2 (S823).

In another embodiment, when the content is intended to be moved invalidly (unlicensed movement) from the storage media 2 to a storage media 3 (S830), only a data file of the content may be moved from the storage media 2 to the storage media 3 and a certification procedure through the server is not performed. However, when the storage media 3 intends to play the content, a new license may need to be issued.

In another embodiment, when the storage media 3 intends to play the content, the storage media 3 may request the right to play the content from the server (S840). Accordingly, the server may deactivate the license which has been provided to the storage media 2 (S841), and provide new license information for playing the content to the storage media 3 (S842).

Figure 9:
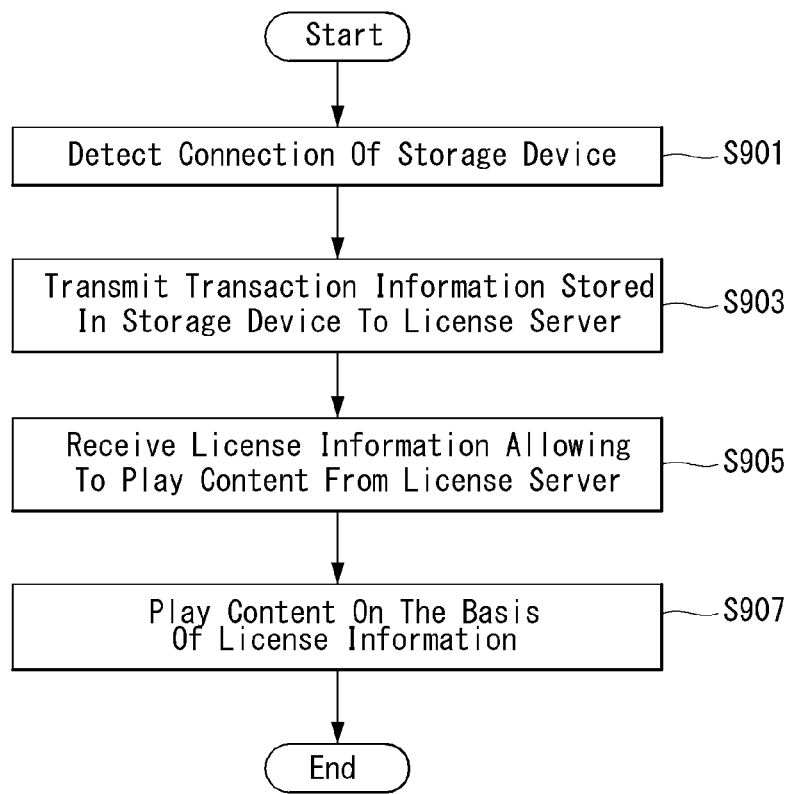
FIG. 9 is a flow chart illustrating a process of obtaining license information for playing secure HD content stored in a storage device according to an embodiment to which the present invention is applied.

FIG. 9 is a flow chart illustrating a process of obtaining license information for playing secure HD content stored in a storage device according to an embodiment to which the present invention is applied.

In order for the user to purchase HD content and play it in a playback device, the user needs to obtain at least one of transaction information and license information corresponding to the HD content.

First, when the storage device storing the secure HD content is plugged in to a playback device, the playback device may detect the plugged-in storage device (S901). When the storage device is detected, the playback device may transmit transaction information stored in the storage device to a license server (S903). Here, the transaction information may refer to information regarding content transaction activity, which may refer to aggregation information of right information. For example, the right information may be information indicating a status for issuing a license for a storage device. The transaction information may include transaction identification information identifying at least one of a corresponding transaction, a seller, and a user, and right information indicating a right information item of corresponding content. Here, the transaction identification information may provide a unique link regarding a corresponding transaction.

Upon receiving the transaction information, the license server may determine the right to play on the basis of the transaction information. When it is determined that the storage device has the right to play the HD content, the license server may generate right information and license information and transmit the generated right information and the license information to the storage device (S905). Here, the license information may be information allowing the purchased content to be played, and may include at least one of license file information and license key information.

The playback device may play the HD content on the basis of at least one of the right information and the license information (S907).

Figure 10:
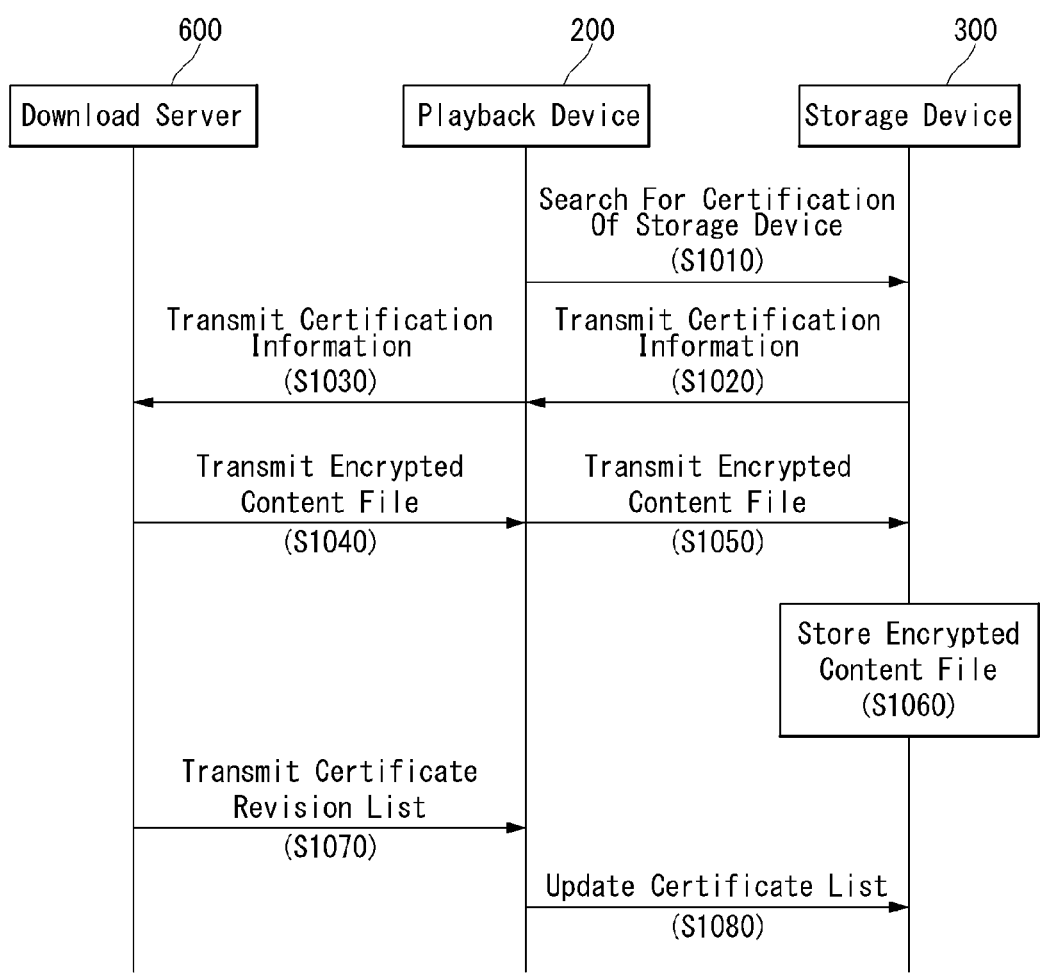
FIG. 10 is a flow chart illustrating a certificate procedure for playing secure HD content according to an embodiment to which the present invention is applied.

FIG. 10 is a flow chart illustrating a certificate procedure for playing secure HD content according to an embodiment to which the present invention is applied.

In order to play secure HD content, a playback device 200 may use at least one of a certificate list, encryption information, device identification information, device certificate information, storage device certificate information, and storage device identification information.

First, when a storage device storing secure HD content is plugged into the playback device 200, the playback device 200 may request device certificate information of the storage device 300 from the storage device 300 (S1010). Upon receiving the request for the device certificate information from the playback device 200, the storage device 300 transmits the device certificate information to the playback device 200 (S1020), and the playback device 200 transmits the device certificate information to a download server 600 (S1030). Here, the download server 600 refers to a server storing a content file and may include a certification server (not shown) for performing certification on content, a storage device, or a playback device.

Upon receiving the device certificate information from the storage device 300, the download server 600 may determine whether the device certificate information is valid. For example, the download server 600 may determine whether the received device certificate information is identical to any one of pieces of device certificate information managed by the download server 600. When the device certificate information from the storage device 300 is not valid according to the determination result, the playback device 200 cannot play the secure HD content.

In contrast, when the device certificate information from the storage device 300 is valid, the download server 600 transmits an encrypted content file to the playback device 200 (S1040), and the playback device 200 transmits the encrypted content file to the storage device 300 (S1050).

The storage device 300 may store the encrypted content file, and here, the received encrypted content file may be stored in a file system of the storage device 300 (S1060).

Meanwhile, the download server 600 transmits the certificate revision list to the storage device 300 (S1070). Upon receiving the certificate revision list, the storage device 300 synchronizes the received certificate revision list with a previously stored certificate list to update the certificate list (S1080). Here, the certificate list refers to a list of pieces of certificate information required for playing the secure HD content, and includes at least one of a content title certificate list, a storage device certificate list, a playback device certificate list, and a license certificate list, for example. The certificate list may be used to certify eligibility of at least one of the playback device, the storage device, and the server, and may be stored in a secure region of the storage device.

Since the certificate list of the storage device 300 is updated as described above, a secure session may be established between the storage device 300 and the playback device 200 or between the storage device 300 and the download server 600, and secure information such as a license key may be transmitted and received through the secure session.

Thus, on the basis of the updated certificate list, the playback device 200 may play the encrypted content file stored in the storage device 300. The encrypted content file may be played on the basis of a specific application installed in the playback device 200.

Figure 11:
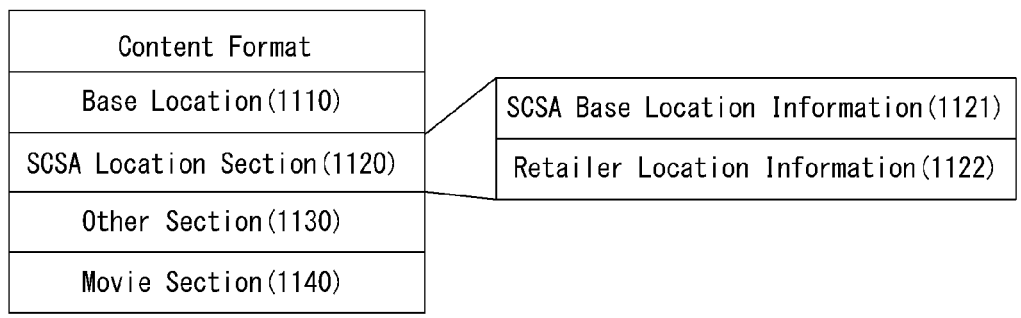

FIGS. 11 and 12 illustrate formats of HD content to which the present invention is applied, according to embodiments to which the present invention is applied.

The formats of HD content to which the present invention is applied may be a digital entertainment content ecosystem file format or an extension thereof.

Referring to FIG. 11, the format of the HD content to which the present invention is applied may include a base location section 1110, an SCSA location section 1120, other section 1130, a movie section 1140. The SCSA location section 1120 may include SCSA base location information 1121 and retailer location information 1122.

These sections may be present in a header of an HD content format or may be present in an extension of the DECE file format. Here, the sections may be positioned on the basis of the order mentioned above.

The SCSA base location information 1121 indicates license server address information for executing a license, and the retailer location information 1122 indicates retailer address information for managing the right related to the HDD content file.

The other section 1130 may refer to a reserved region for a later use.

The movie section 1140 may include image data of the HD content.

Referring to FIG. 12, the format of the HD content to which the present invention is applied may include at least one of a location section 1210, an asset information section 1220, and a meta data section 1230.

The location section 1210 may include at least one of license server location information 1211, retailer location information 121, and other information 1213, and the asset information section 1220 may include at least one of secure level information 1221, media profile information 1222, and asset identification information 1223. The meta data section 1230 may include at least one of meta data key identification information 1231, sample number information 1232, and size information.

The license server location information 1211 may indicate information indicating a location of a license server, the retailer location information 1212 may indicate information indicating a location of a retailer, and other information 1213 may indicate subdomain information of a retailer or may refer to a reserved region for a later use.

The secure level information 1221 may indicate secure level information of HD content, the media profile information 1222 may indicate version information of a media profile, and the asset identification information 1223 may indicate identification information of the HD content.

The meta data key identification information may indicate key identification information for decrypting encrypted meta data, the sample number information 1232 may indicate the number of samples that may be potentially changed, and the size information 1233 may indicate a size of a meta data segment.

In another embodiment to which the present invention is applied, a media file structure for storing a license file for playing HD content will be described.

The media file structure may include a protection system-specific header section. Here, the protection system-specific header section may include a movie section or a partial movie section. Here, system identification information field within the protection system-specific header section may be matched to identification information of a system for providing HD content described in this disclosure. Also, key identification information related to a sample may be matched to any one of pieces of key identification information within the protection system-specific header section.

FIG. 13 is a view illustrating a level of HD content and a level of a playback device for playing the HD content to which the present invention is applied according to an embodiment to which the present invention is applied.

HD content to which the present invention is applied may include content level information 1310, and the content level information 1310 indicates categorized content attribute information. Content provided in the system to which the present invention is applied may be provided as a different profile according to the content level information 1310. For example, in a case in which the content level information 1310 is "Level 1", content may correspond to a standard definition (SD) profile, and in a case in which the content level information 1310 is "Level 2", content may correspond to a high definition (HD) profile, and in a case in which the content level information 1310 is "Level 3", content may correspond to a quad-high definition (QHD) profile. The content level information 1310 may include video profile information 1311 and audio profile information 1313.

For example, in a case in which the content level information 1310 indicates "Level 1", the video profile information 1311 of content may correspond to H.264 codec, first profile (L3 profile, etc.), and resolution 480p, in a case in which the content level information 1310 indicates "Level 2", the video profile information 1311 of content may correspond to H.264 codec, second profile (high profile, etc.), and resolution 720p, 1080p, and in a case in which the content level information 1310 indicates "Level 3", the video profile information 1311 of content may correspond to H.265 codec, third profile (main profile, etc.), and resolution 1440p. Also, the audio profile information 1313 may correspond to a first profile (AAC codec, etc.), a second profile (HE-AAC codec), and a third profile (MPS, USAC, etc.)

Meanwhile, a playback device playing HD content may be provided with various levels according to capability thereof. For example, whether a playback device is able to play HD content may be determined on the basis of a level thereof. That is, a playback device cannot play content having content level information higher than device level information thereof. In a specific example, in a case in which the device level information indicates "Level 1", a corresponding playback device may play content corresponding to "Level 1", in a case in which the device level information indicates "Level 2", a corresponding playback device may play content corresponding to "Level 1" and Level 2", and in a case in which the device level information indicates "Level 1", a corresponding playback device may play content corresponding to every content level information.

In another example, whether to apply a HD content play function may be determined on the basis of a device level. Here, the play function may include playing, copying, moving, or deleting content. That is, a playback device may perform the play function on content having content level information higher than device level information thereof.

Figure 14:
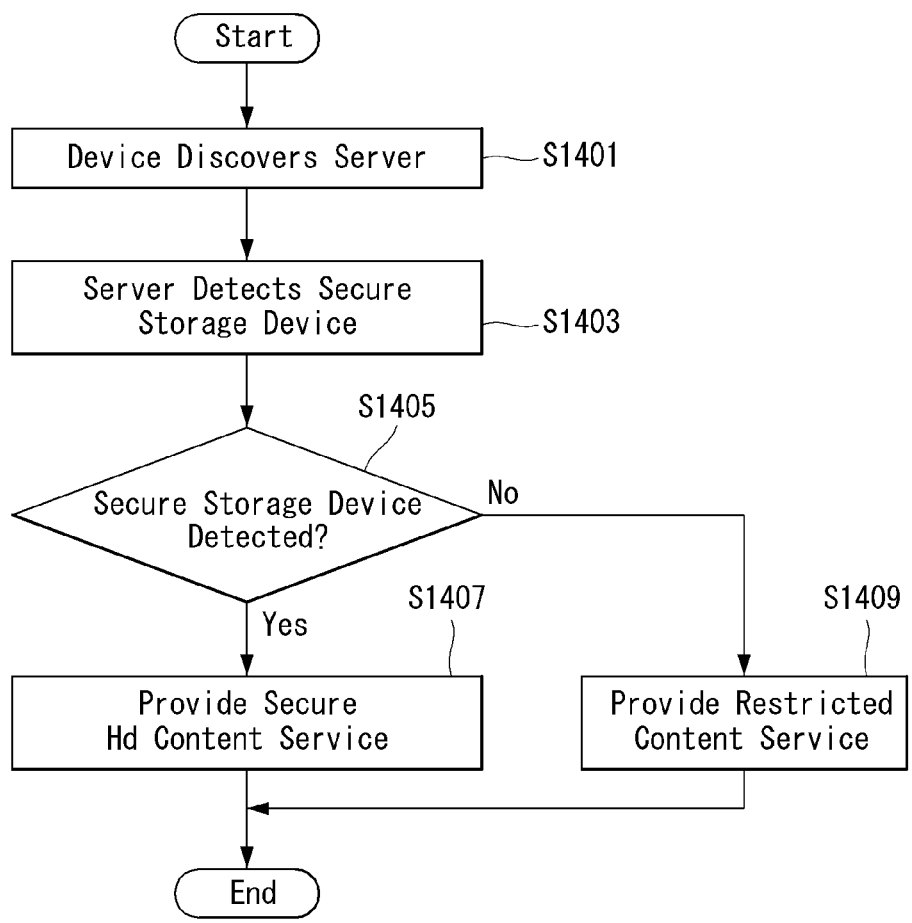
FIG. 14 is a view illustrating a system architecture providing secure HD content through a cloud service and a method for providing the same according to an embodiment to which the present invention is applied.

FIG. 14 is a view illustrating a system architecture providing secure HD content through a cloud service and a method for providing the same according to an embodiment to which the present invention is applied.

Secure HD content to which the present invention is applied may be downloaded through a cloud. Here, license information for playing the HD content may be downloaded from a license server.

For example, in relation to supply the HD content, the user may be provided the HD content though a cloud service. Here, a content provider may provide the HD content to the user through the cloud service.

Also, the license server may provide license information required for playing the HD content to the user through the cloud service.

Referring to FIG. 14, a playback device may discover a download server or a license server through searching (S1401). Here, the server may detect a secure storage device plugged in to the playback device (S1403).

Whether to provide the HD content service may be determined according to whether the server detects the secure storage device (S1405). For example, when the server detects the secure storage device, the server may provide content to the storage device or provide license information to the storage device through the cloud service (S1407). However, when the server fails to detect the secure storage device, the server may provide restricted content or restricted license information to the storage device or may not be able to provide a HD content service (S1409).

Figure 15:
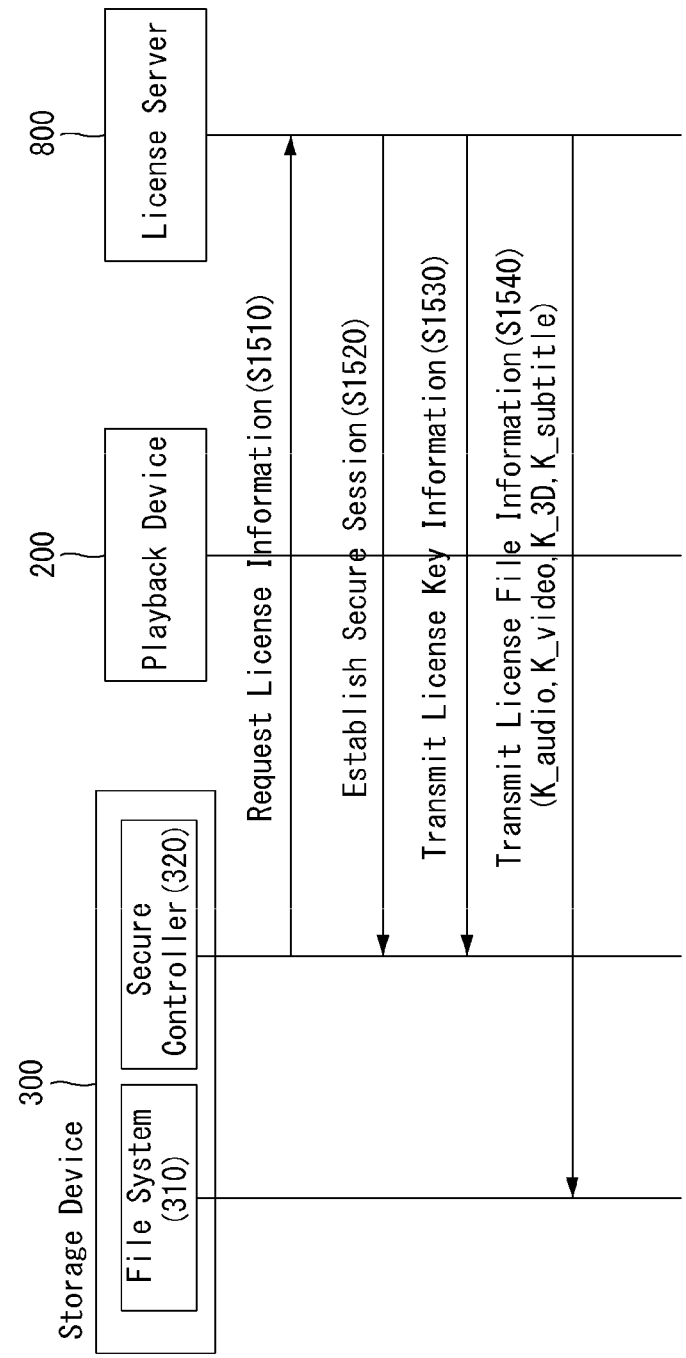
FIG. 15 is a flow chart illustrating a process of obtaining license information for playing secure HD content stored in a storage device according to an embodiment to which the present invention is applied.

FIG. 15 is a flow chart illustrating a process of obtaining license information for playing secure HD content stored in a storage device according to an embodiment to which the present invention is applied.

The user may purchase secure HD content, and in order to play the purchased HD content, the user needs to be provided with license information from the license server 800.

When the user purchases HD content, the user may be provided with transaction information from a seller, and the provided transaction information may be stored in the storage device 300. Here, the storage device 300 may include a file system 310 and a secure controller 320.

The file system 310 may store the encrypted HD content and license information, encryption information, and a certificate revision list (CRL) in order to play the encrypted HD content.

The secure controller 3200 may be connected to the license server 800 through the playback device 200, and may perform a mutual response process (handshake process) with the license server with respect to license information, encryption information, and a certificate list required for playing content.

Referring to FIG. 15, the secure controller 320 may access the license server 800 through the playback device 200 to request license information (S1510). Upon receiving the license information request, the license server 800 establishes a secure session with the secure controller 320.

When the secure session is established, license information may be transmitted through the secure session. For example, the license server 800 may transmit license key information to the secure controller 320 (S1530) and transmit license file information to the file system 310 (S1540).

Here, the license key information or the license file information may include at least one of video key information, audio key information, specific key information, and meta data key information. Here, the specific key information may be used to decrypt a specific portion of a sample.

In another embodiment to which the present invention is applied, the license server may generate a license file. The license server may receive a shadow key of the playback device from the playback device. The license server may encrypt video key information K1_video and audio key information (K1_audio) by using the shadow key. In encrypting, common key information common to every playback device may be used.

The license server may generate a shadow key by using license key information stored in the storage device. The license server may re-encrypt the video key information K1_video and the audio key information K1_audio by using the shadow key to generate re-encrypted video key information K2_video and audio key information K2_audio. The license server may re-encrypt the video key information K2_video and the audio key information K2_audio to generate re-encrypted video key information K3_video and audio key information K3_audio. In this manner, the license server may generate a license file.

Figure 16:
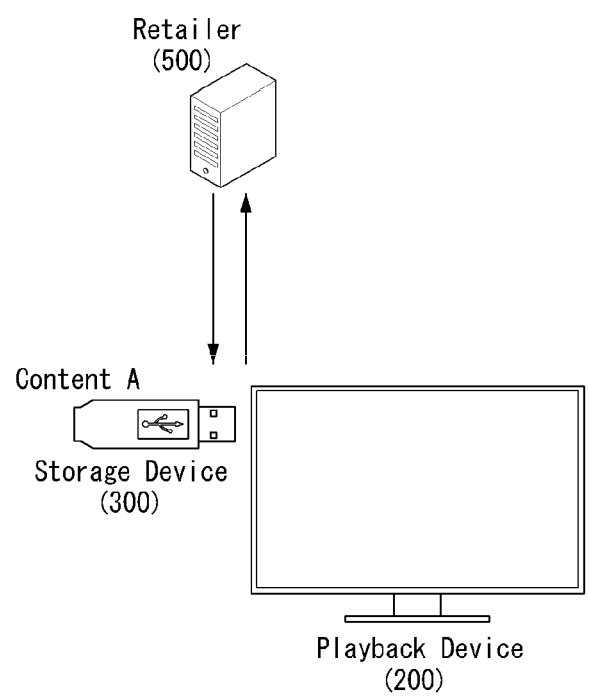
FIG. 16 is a view illustrating a method for playing secure HD content purchased from a retailer according to an embodiment to which the present invention is applied.

FIG. 16 is a view illustrating a method for playing secure HD content purchased from a retailer according to an embodiment to which the present invention is applied.

In this embodiment, a relationship between the playback device 200 to which the storage device 300 is connected and the retailer 500 is described, but this is merely illustrative and the contents of FIG. 6 may be applied.

Referring to FIG. 16, the user may purchase secure HD content from the retailer 500, and the retailer 500 may request content purchase from a content provider or a different retailer and receive content therefrom. Upon receiving a purchase request from the user, the retailer 500 may provide the right to play HD content to the user through generation of transaction information in the license server. For example, the retailer 500 may provide transaction information to the user 100, and may provide transaction details to the license server. Here, the provided transaction information may be stored in the storage device 300, and may correspond to single HD content. Meanwhile, the transaction information may be generated by the retailer 500. The retailer 500 may provide the HD content to the storage device 300.

When the user requests playing of the HD content from the playback device 200, the transaction information stored in the storage device 300 may be transmitted to the license server, and the license server may confirm the right to play on the basis of the transaction information. When it is determined that the storage device has the right to play, the license server may generate right information and license information and transmit the generated right information and license information to the storage device 300. Upon receiving the right information and license information, the storage device 300 may play the HD content.

That is, in order for the user to purchase content from the retailer 500 and play it in the playback device 200, the user needs to obtain at least one of the transaction information and license information corresponding to the content.

The retailer 500 may have content purchase information of the user, and may also know the right to use content retained by the user. Whether the content is allowed to be played may be known through license information stored in the storage unit 300. Also, the retailer 500 may define the right of the user and/or the right to play content through an ID and a password of a Web side. Meanwhile, the user ID and password of the retailer may be included in the license information stored in the storage device 300 or in the content.

Also, the storage device 300 may include at least one of DRM identification information, memory identification information, content identification information, and retailer identification information.

The DRM identification information may include information identifying at least one DRM system, and the memory identification information may include at least one of information regarding whether memory of the playback device is an internal memory or an external memory, memory type information (for example, USB, SD, HDD, or SDD, etc.) memory manufacturer information, memory chip information, user information, and retailer information.

The content identification information may include at least one of physical identification information (physical ID) or logical identification information (logical ID), and, in the file format of the content, a video file, an audio file, and right information file may be configured as a single file, or may be configured as separate files within a package file. Here, the physical ID may include at least one of a video file and an audio file, and the logical ID may include at least one of DRM information, right information, domain information, and user information.

The retailer identification information may include at least one of uniform resource locator (URL) information and user account information.

In another embodiment to which the present invention is applied, even in a case in which a plurality of pieces of content A and B purchased from one retailer 500 are separately stored in a plurality of storage devices, the user may play desired content on the basis of license information.

Whether the plurality of pieces of content A and B are licensed content or unlicensed content may be determined on the basis of transaction information received from the retailer 500 or may be determined on the basis of license information stored in each of the storage devices.

For example, in a case in which content A purchased from the retailer 500 is stored in a storage device 1, whether the content A is available to be played may be determined on the basis of license information stored in the storage device 1, and in a case in which content B purchased from the retailer 500 is stored in a storage device 2, whether the content B is available to be played may be determined on the basis of license information stored in the storage device 2.

Figure 17:
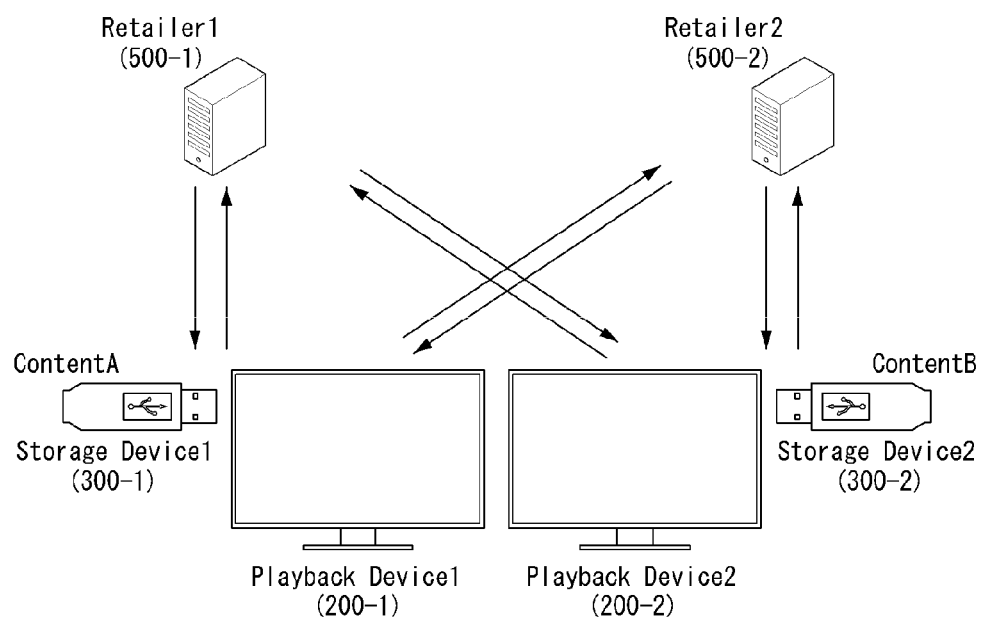
FIG. 17 is a view illustrating a method for playing secure HD content purchased from another retailer according to an embodiment to which the present invention is applied.

FIG. 17 is a view illustrating a method for playing secure HD content purchased from another retailer according to an embodiment to which the present invention is applied.

In the present embodiment, a method for copying content purchased from a different retailer and playing the copied content will be described.

Referring to FIG. 17, content A purchased from a retailer 1 500-1 is stored in the storage device 1 300-1, and content B purchased from a retailer 2 500-2 is stored in the storage device 2 300-2. The storage device 1 300-1 is connected to a playback device 1 200-1 and the storage device 2 300-2 is connected to a playback device 2 200-2. Here, in a case in which the content B stored in the storage device 2 300-2 is intended to be copied to the storage device 1 300-1 and played in the playback device 1 200-1, if the playback device 1 200-1 cannot obtain transaction information or license information regarding the content B, the playback device 200-1 cannot play the content B.

Thus, the storage device 1 300-1 should know retailer information, transaction information, or license information regarding the content B. For example, when the storage device 1 300-1 is connected to the retailer 2 500-2, the storage device 1 300-1 may obtain transaction information regarding the content B from the retailer 2 500-2 or may access the license server to obtain license information regarding the content B.

Also, the storage device 1 300-1 may obtain transaction information regarding the content B by using retailer information included in the content B. Alternatively, when license information is included in the content B, the playback device 1 200-1 may play the content B.

Figure 18:
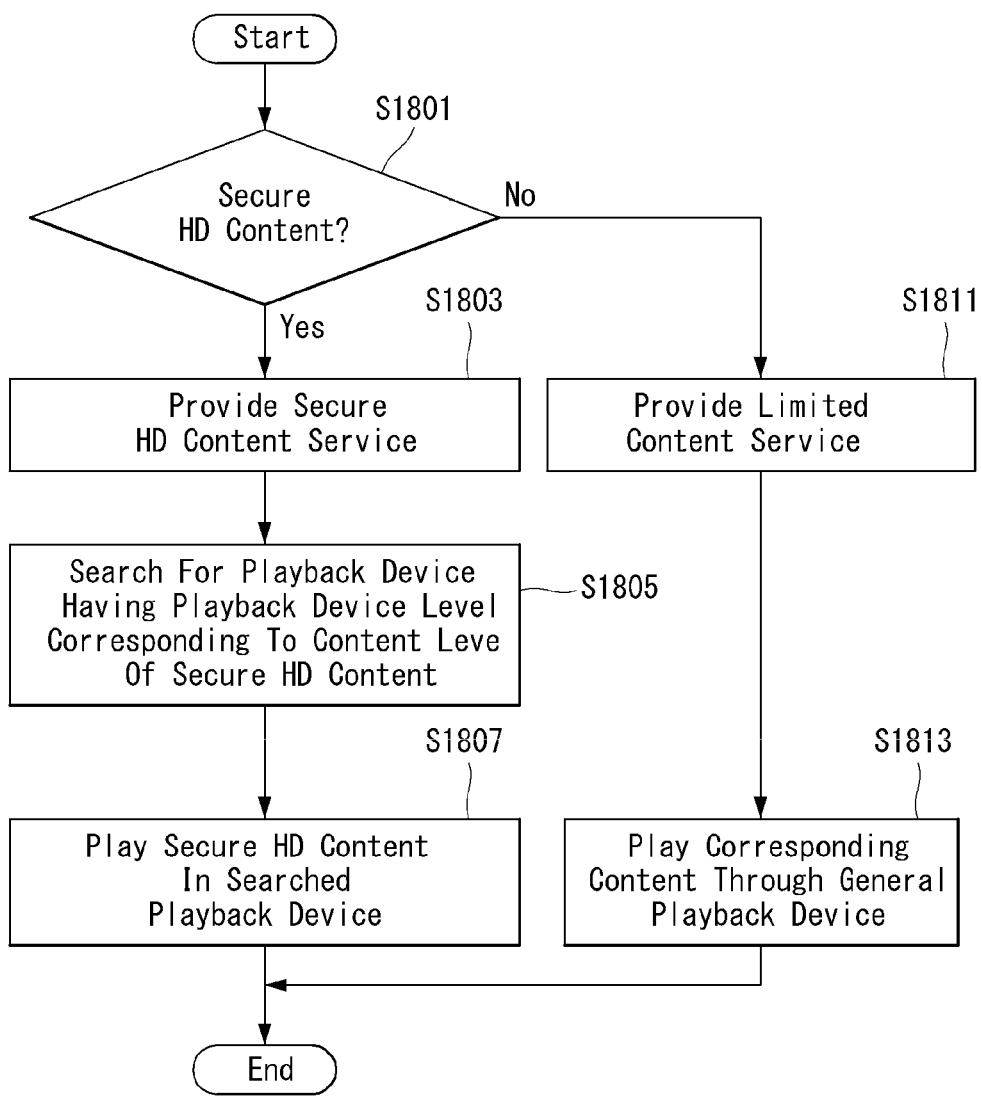
FIG. 18 is a flow chart illustrating a procedure for providing an application program interface (API) service regarding secure HD content according to an embodiment to which the present invention is applied.

FIG. 18 is a flow chart illustrating a procedure for providing an application program interface (API) service regarding secure HD content according to an embodiment to which the present invention is applied.

The secure HD content may be stored simultaneously when general content is stored in a general file system. Here, in order to use the secure HD content, a secure HD content API should be supported. When the secure HD content API is supported, the secure HD content may be played through a playback device corresponding to a convent level of the secure HD content.

Referring to FIG. 18, first, it is required to determine whether content stored in a storage device is general content or secure HD content (S1801). When the content stored in the storage device is secure HD content, the secure HD content API may be executed to provide a secure HD content service (S1803).

When the secure HD content API is executed, a playback device having a playback device level corresponding to content level of the secure HD content may be searched (S1805). The secure HD content may be played through the searched playback device (S1807).

In contrast, when the content stored in the storage device is general content in step S1801, a restricted content service may be provided (S1811). That is, the secure HD content cannot be played. As a result, the general content is played through a general playback device (S1813).

Figure 19:
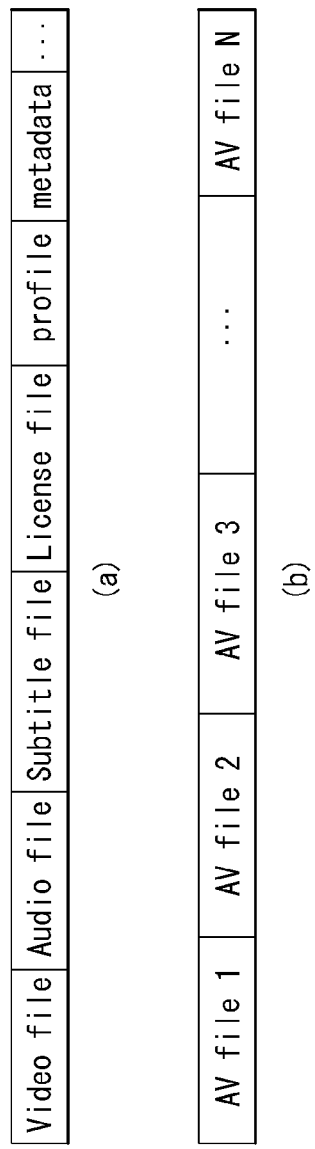
FIG. 19 is a view illustrating a file type of secure HD content according to an embodiment to which the present invention is applied.

FIG. 19 is a view illustrating a file type of secure HD content according to an embodiment to which the present invention is applied.

Referring to FIG. 19, the secure HD content may be defined as a media package type. The media package type may include a plurality of files.

As illustrated in FIG. 19(a), the secure HD content may have a structure including at least one of a video file, an audio file, a subtitle file, a license file, a video profile, meta data, time information (for example, a content issue date, a license issue data, etc.), version information (for example, a content version, a license version, etc.), and retailer information (for example, a retailer URL, user account information, and the like).

When the secure HD content has the aforementioned structure, each of the files within the secure HD content may be controlled. For example, in a case in which only the video file within the secure HD content is required to be updated, only the video file may be changed to update the secure HD content. Here, meta data may be used to control updating.

Meanwhile, as illustrated in FIG. 19(b), the secure HD content may have a structure including a plurality of AV files.

Figure 20:
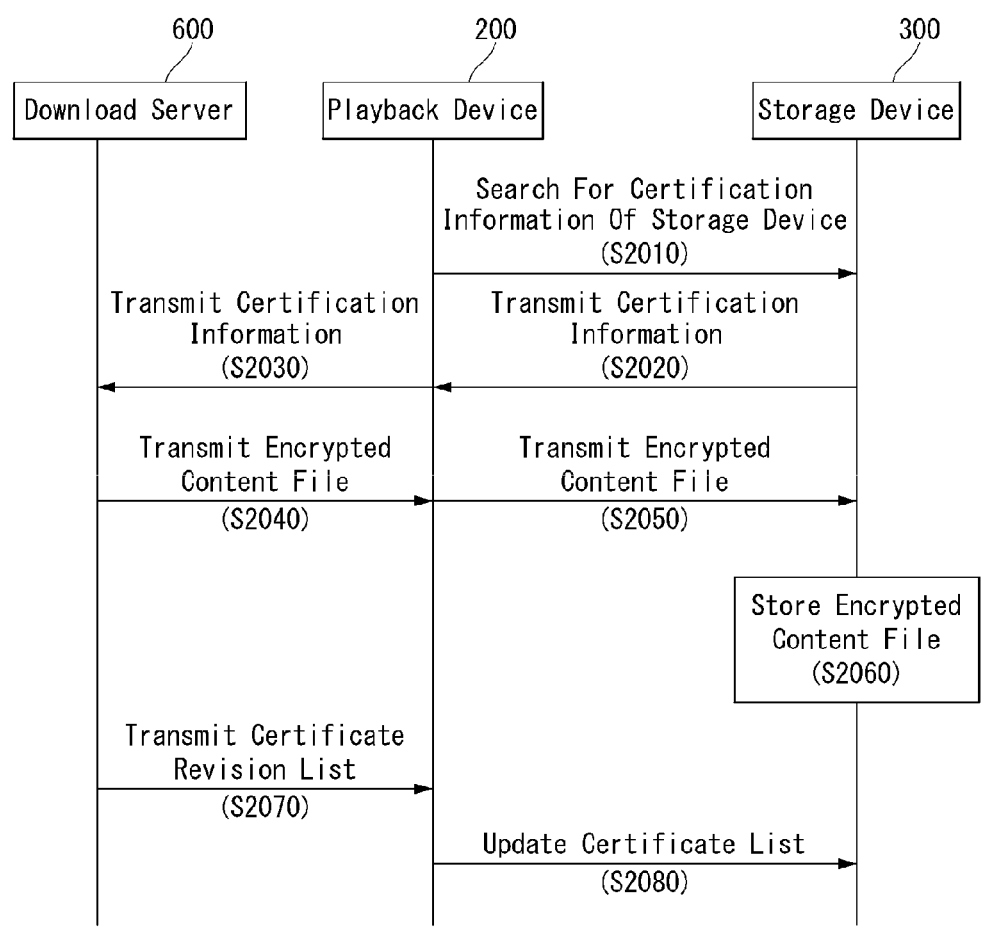
FIG. 20 is a flow chart illustrating a process of providing content through a session established between devices according to an embodiment to which the present invention is applied.

FIG. 20 is a flow chart illustrating a process of providing content through a session established between devices according to an embodiment to which the present invention is applied.

In order to play the secure HD content, the playback device 200 may use at least one of a certificate list, encryption information, device identification information, device certificate information, storage device certificate information, and storage device identification information.

First, when the storage device 300 storing the secure HP content is plugged into the playback device 200, the playback device 200 may request device certificate information of the storage device 300 from the storage device 300. When the request for the device certificate information is received, the storage device 300 transmits the device certificate information to the playback device 200 (S2020), and the playback device 200 transmits the device certificate information to the download server 600 (S2030). Here, the download server 600 refers to a server storing a content file, and the download server 600 may include a certification server (not shown) for certifying content, a storage device, or a playback device.

The download server 600 receives the device certificate information of the storage device 300 and determines whether the device certificate information is valid. For example, the download server 600 may determine whether the device certificate information of the storage device 300 is identical to any one of pieces of device certificate information managed by the download server 6000. In a case in which the device certificate information of the storage device 300 is not valid according to a determination result, the playback device 200 cannot play the secure HD content.

In contrast, when the device certificate information of the storage device 300 is valid according to the determination result, the download server 600 transmits an encrypted content file to the playback device 200 (S2040) and the playback device 200 transmits the encrypted content file to the storage device (S2050).

The storage device 300 may store the encrypted content file, and here, the received encrypted content file may be stored in the file system of the storage device 300 (S2060).

The encrypted content file may include content level information, and the content level information indicates categorized content attribute information. A content file provided in the system to which the present invention is applied may be provided as a different profile according to the content level information. For example, in a case in which the content level information is "Level 1", content may correspond to a standard definition (SD) profile, and in a case in which the content level information is "Level 2", content may correspond to a high definition (HD) profile, and in a case in which the content level information is "Level 3", content may correspond to a quad-high definition (QHD) profile.

Also, the playback device 200 may be provided with various levels according to capability thereof. For example, whether a playback device is able to play HD content may be determined on the basis of a level thereof. For example, in a case in which device level information indicates "Level 1", the playback device may play content corresponding to "Level 1", in a case in which the device level information indicates "Level 2", the playback device may play content corresponding to "Level 1" and Level 2", and in a case in which the device level information indicates "Level 1", the playback device may play content corresponding to every content level information.

Meanwhile, the download server 600 transmits the certificate revision list to the storage device 300 (S2070). Upon receiving the certificate revision list, the storage device 300 synchronizes the received certificate revision list with a previously stored certificate list to update the certificate list (S2080). Here, the certificate list refers to a list of pieces of certificate information required for playing the secure HD content, and includes at least one of a content title certificate list, a storage device certificate list, a playback device certificate list, and a license certificate list, for example. The certificate list may be used to certify eligibility of at least one of the playback device, the storage device, and the server, and may be stored in a secure region of the storage device.

Since the certificate list of the storage device 300 is updated as described above, a secure session may be established between the storage device 300 and the playback device 200 or between the storage device 300 and the download server 600, and secure information such as a license key may be transmitted and received through the secure session.

Thus, on the basis of the updated certificate list, the playback device 200 may play the encrypted content file stored in the storage device 300. The encrypted content file may be played on the basis of a specific application installed in the playback device 200.

In this manner, a session is established when information is transmitted between devices in the system to which the present invention is applied, a command may be transmitted through the session, and a response thereto may be received. Here, the session may be identified by session identification information, and the session identification information may be distinguishably defined according to whether key information for protecting content is exchanged or may indicate whether key information for protecting content is exchanged.

For example, the session identification information may indicate one of at least two types of session statuses, and the at least two types of session statuses may include a secure session and non-secure session. Here, the secure session refers to a session in which key information for protecting content can be exchanged, and the non-secure session refers to a session in which key information for protecting content cannot be exchanged. That is, in the case of the non-secure session, an independent command is allowed in a certificate process for exchanging key information.

Here, the secure session and non-secure session are terms defined in this disclosure and may be replaced with other terms having the same meaning. For example, the secure session and non-secure session may be referred to as a local session or a network session.

In an embodiment to which the present invention is applied, the session identification information may be represented by 16 hexadecimal but is not limited thereto. For example, first session identification information indicating the secure session may be represented as 0x0001, and second session identification information indicating non-secure session may be represented as 0x0000.

Meanwhile, the session identification information may be included in a command or a response message thereto and transmitted. The session identification information included in the command may refer to a session identifier allocated by a storage device, and the session identification information included in the response message with respect to the command may have the same value as that of the session identification information included in the command.

Figure 21:
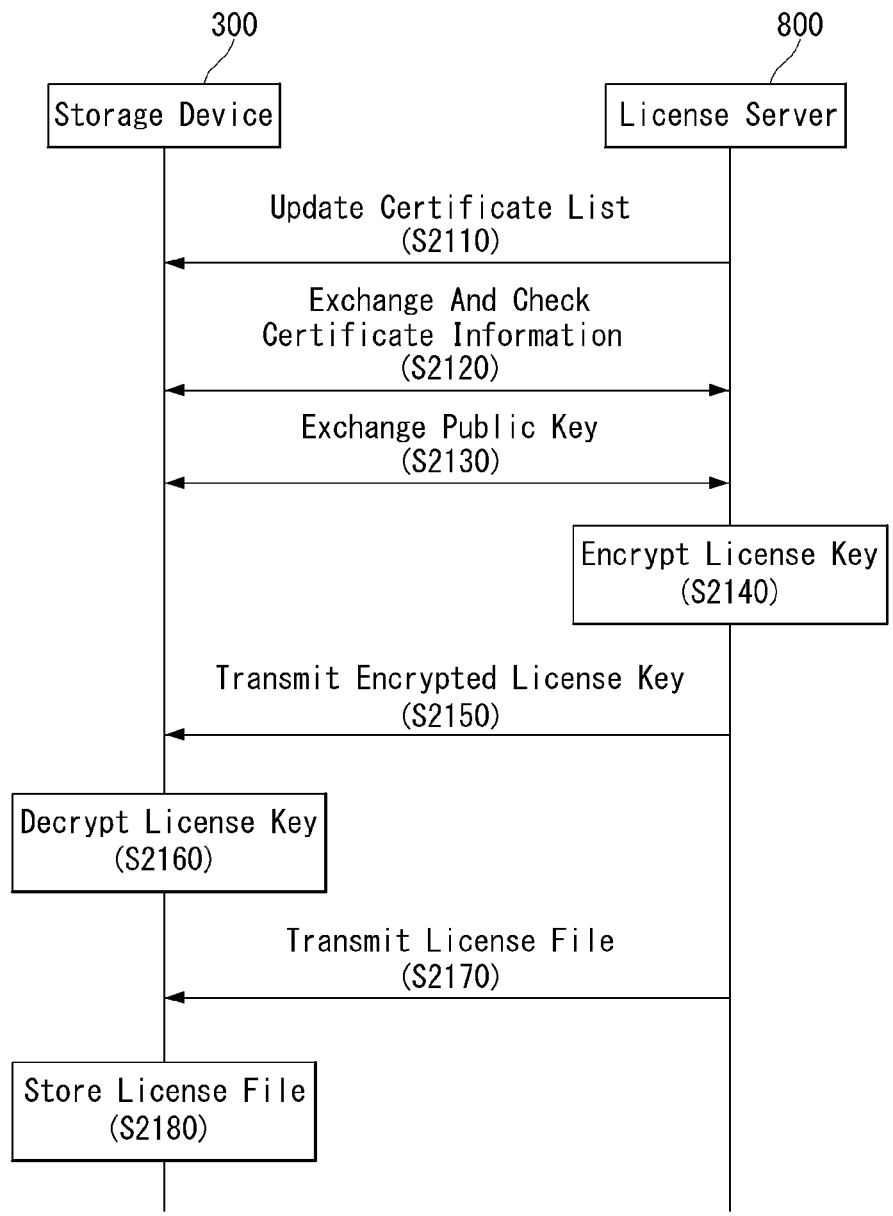
FIG. 21 is a flow chart illustrating a process of providing license information through a session established between devices according to an embodiment to which the present invention is applied.

FIG. 21 is a flow chart illustrating a process of providing license information through a session established between devices according to an embodiment to which the present invention is applied.

In order to play an encrypted content file in a file system of a storage device, the storage device needs to obtain license information. FIG. 21 illustrates a process of obtaining license information by the storage device.

In order to receive license information, first, the storage device 300 may be connected to the license server 800. Here, the storage device 300 may be connected through a playback device. The license server 800 may receive a certificate list of the storage device 300 from the storage device 300 and determine whether the received certificate list is a certificate revision list. In a case in which the certificate list of the storage device 300 is not a certificate revision list, the license server 800 may request the storage device 300 to update the certificate list (S2110). Here, the certificate list may be a certificate revision list obtained from a key issuance center.

The storage device 300 may receive the certificate revision list and synchronize it with the previously stored certificate list to update the certificate list. Here, the certificate list refers to a list of pieces of certificate information required for playing the secure HD content, and includes at least one of a content title certificate list, a storage device certificate list, a playback device certificate list, and a license certificate list, for example. The certificate list may be used to certify eligibility of at least one of the playback device, the storage device, and the server, and may be stored in a secure region of the storage device.

As the license server 800 and the storage device 300 exchange certificate information of the storage device 300, whether the storage device 300 is a certified storage device may be determined (S2120). Thereafter, the license server 800 and the storage device 300 may exchange a public key (S1230).

After exchanging the public key, the license server 800 may encrypt the license key (S2140). The license server 800 may transmit the encrypted license key and the license file to the storage device 300 (S2150 and S2170).

Upon receiving the encrypted license key and the license file, the storage device 300 may decrypt the encrypted license key (S2160) and store the license file in a secure region of the storage device 300 (S2180).

In this manner, the certificate list of the storage device 300 may be updated, whereby a secure session may be established between the storage device 300 and the license server 800 and secure information such as the license key may be transmitted and received through the secure session. Thus, on the basis of the updated certificate list, the playback device may play the encrypted content file stored in the storage device 300.

Figure 22:
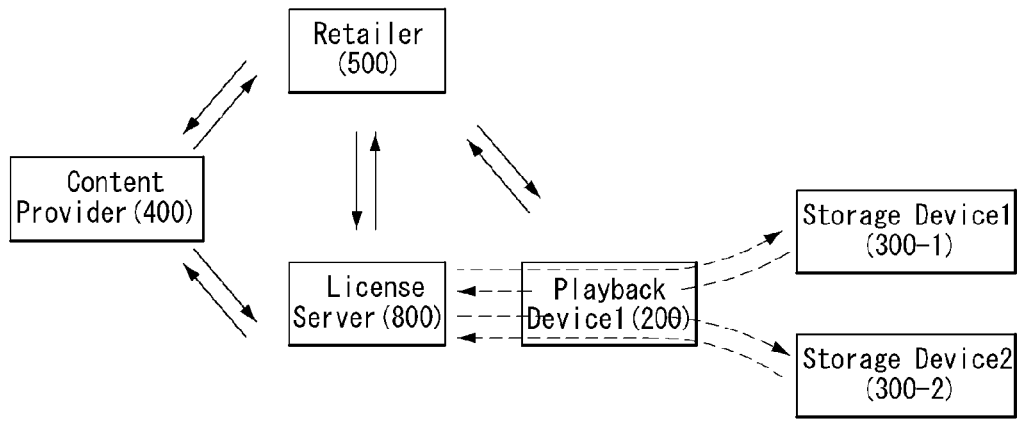
Figure 23:
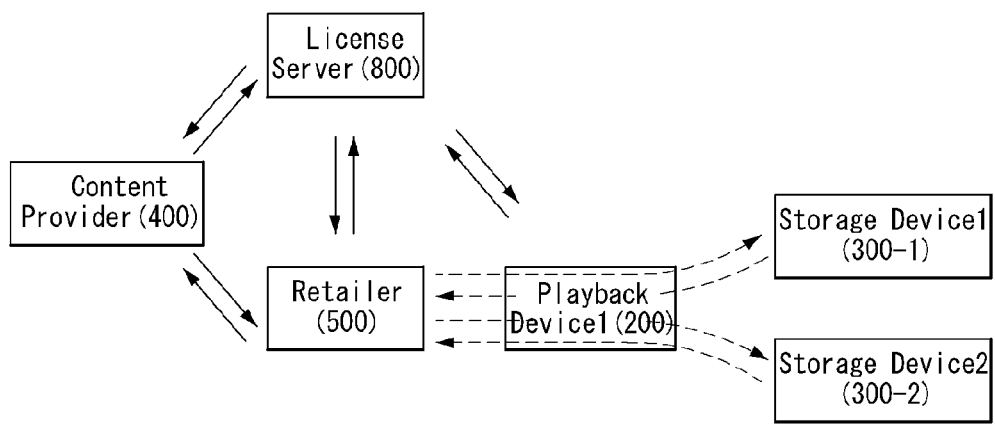

FIGS. 22 and 23 are views illustrating embodiments to which the present invention is applied, in which FIG. 22 is a block diagram illustrating establishment of a session between a license server and a plurality of storage devices through a single playback device, and FIG. 23 is a block diagram illustrating establishment of a session between a retailer and a plurality of storage devices through a single playback device.

A session is established when information is transmitted between devices within the system to which the present invention is applied, and here, the session may be a plurality of secure sessions. For example, in a case in which a storage device 1 300-1 and a storage device 2 300-2 are connected to a playback device 1 200, the playback device 1 200 may have a plurality of secure sessions. In a case in which the plurality of secure sessions are established, a function of copying or moving content may be more conveniently performed.

In a case in which the user purchases content, a piece of transaction information may be generated. Here, devices within the system to which the present invention is applied may need to establish a session with one or more protocols. For example, the playback device 1 200 may be connected to the storage device 1 300-1 and the storage device 2 300-2 to separately establish sessions. When the user requests copying content from the storage device 1 300-1 to the storage device 2 300-2, the playback device 1 200 should simultaneously maintain protocols with the storage device 1 300-1 and the storage device 2 300-2. Here, the playback device 1 200 may identify respective protocols by checking at least one of storage device identification information or session identification information.

As illustrated in FIG. 22, the license server 800 may establish secure sessions with the storage device 1 300-1 and the storage device 2 300-2, respectively, though the playback device 1 200. Here, the respective secure sessions may be identified by separate session identification information. The playback device 1 200 may simultaneously play content A of the storage device 1 300-1 and content B of the storage device 2 300-2, and here, the content A and the content B may be played in different windows.

As illustrated in FIG. 23, the retailer 500 may also establish secure sessions with the storage device 1 300-1 and the storage device 2 300-2, respectively, through the playback device 1 200. Similarly, the respective secure sessions may be identified by separate session identification information.

Through the established secure sessions, secure information such as a license key may be transmitted and received. Thus, on the basis of the license information, the playback device 1 200 may play the encrypted content files stored in the storage device 1 300-1 and the storage device 2 300-2.

Figure 24:
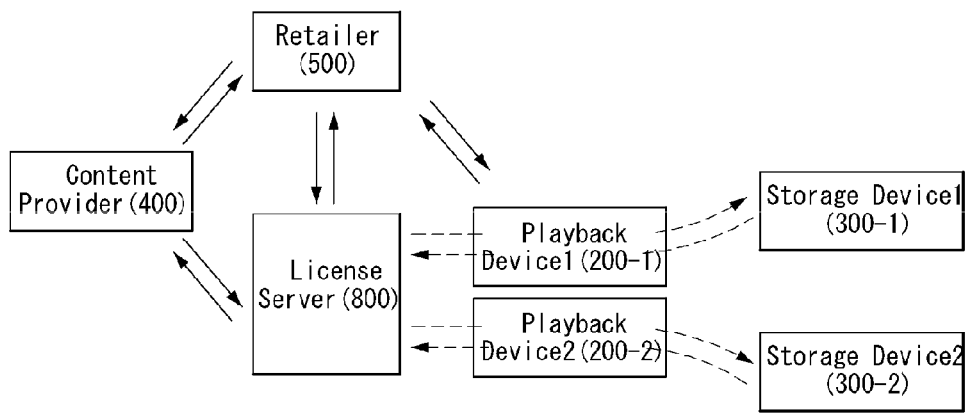
Figure 25:
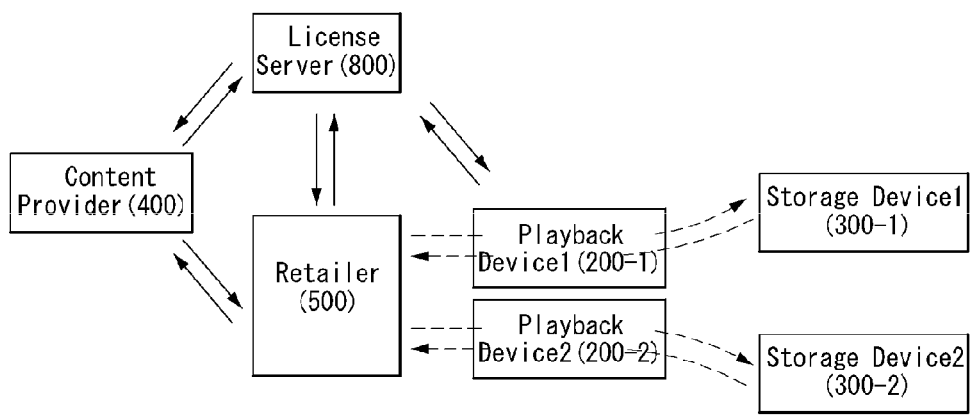

FIGS. 24 and 25 are views illustrating embodiments to which the present invention is applied, in which FIG. 24 is a block diagram illustrating establishment of a session between a license server and a plurality of storage devices through a plurality of playback devices, and FIG. 25 is a block diagram illustrating establishment of a session between a retailer and a plurality of storage devices through a plurality of playback devices.

When information is transmitted between devices within the system to which the present invention is applied, a session is established, and here, the session may be a plurality of secure sessions. Here, in a case in which a playback device is in plurality, a plurality of secure sessions may be established for each transaction. For example, in a case in which the storage device 1 300-1 is connected to the playback device 1 200-1 and the storage device 2 300-2 is connected to a playback device 2 200-2, the playback device 1 200-1 may establish a secure session with the storage device 1 300-1, and the playback device 2 200-2 may establish a secure session with the storage device 2 300-2.

In a case in which the plurality of secure sessions are established, the user may copy or move content stored in the storage device 1 300-1 to the storage device 2 300-2.

In this case, transaction information may include session identification information, so the license server 800, the retailer 500, or the playback devices 1 200-1 and 200-2 may identify each session identification information.

As illustrated in FIG. 24, the license server 800 may establish a first secure session with the storage device 1 300-1 through the playback device 1 200-1 and establish a second secure session with the storage device 2 300-2 through the playback device 2 200-2. Here, the first secure session and the second secure session may be identified by respective session identification information.

Also, as illustrated in FIG. 25, the retailer 500 may establish a third secure session with the storage device 1 300-1 through the playback device 1 200-1, and establish a fourth secure session with the storage device 2 300-2 through the playback device 2 200-2. Here, the third secure session and the fourth secure session may be identified by session identification information.

Through the established secure sessions, secure information such as a license key may be transmitted and received. Thus, on the basis of the license information, the playback device 1 200 or the playback device 2 200-2 may play the encrypted content files stored in the storage device 1 300-1 and the storage device 2 300-2.

Figure 26:
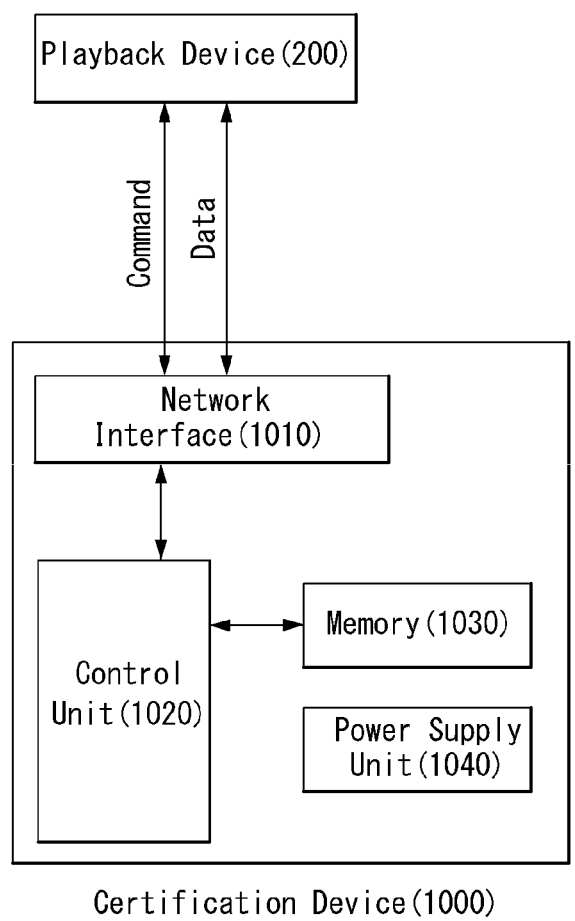
FIG. 26 is an internal block diagram of a certification device managing the right to play content through communication with a playback device according to an embodiment to which the present invention is applied.

FIG. 26 is an internal block diagram of a certification device managing the right to play content through communication with a playback device according to an embodiment to which the present invention is applied.

The playback device 200 to which the present invention is applied may be connected to a certification device 1000 and transmit a request message issuing a command or receive a response message from the certification device 1000. Upon receiving the response message, the playback device 200 may provide a user interface to the user or may display corresponding contents.

The certification device 1000 to which the present invention is applied may include a network interface 1010, a control unit 1020, a memory 1030, and a power supply unit 1040.

The network interface 1010 serves to allow for transmission of a command, a request message, an action, or a response message between the playback device 200 and the certification device 1000.

The control unit 1020 controls a general operation of the certification device 1000. For example, the control unit 1020 may scan or search for the presence of the playback device 200, check a status of the playback device 200, or detect a connection with the playback device 200.

Also, when a request for certification key information of a storage device is received, the control unit 1020 may check whether the certification key information is present within the certification device 1000 and transmit the certification key information to the playback device 200.

Also, when content license information request is received from the playback device 200, the control unit 1020 may check whether the content license information is present within the certification device 1000, and transmit the content license information to the playback device 200.

Also, the control unit 1020 may transmit and receive a signal in order to periodically check whether the connection between the playback device 200 and the certification device 1000 is maintained.

The memory 1030 may store at least one of certification key-related information and content license-related information of the storage device.

The power supply unit 1040 may supply power required for operations of the respective components upon receiving external power or internal power under the control of the control unit 1020.

Meanwhile, the certification device 1000 is illustrated as a separate component in FIG. 26, but it is merely illustrative and the certification device 1000 may be included in a storage device including content or any other device.

Figure 27:
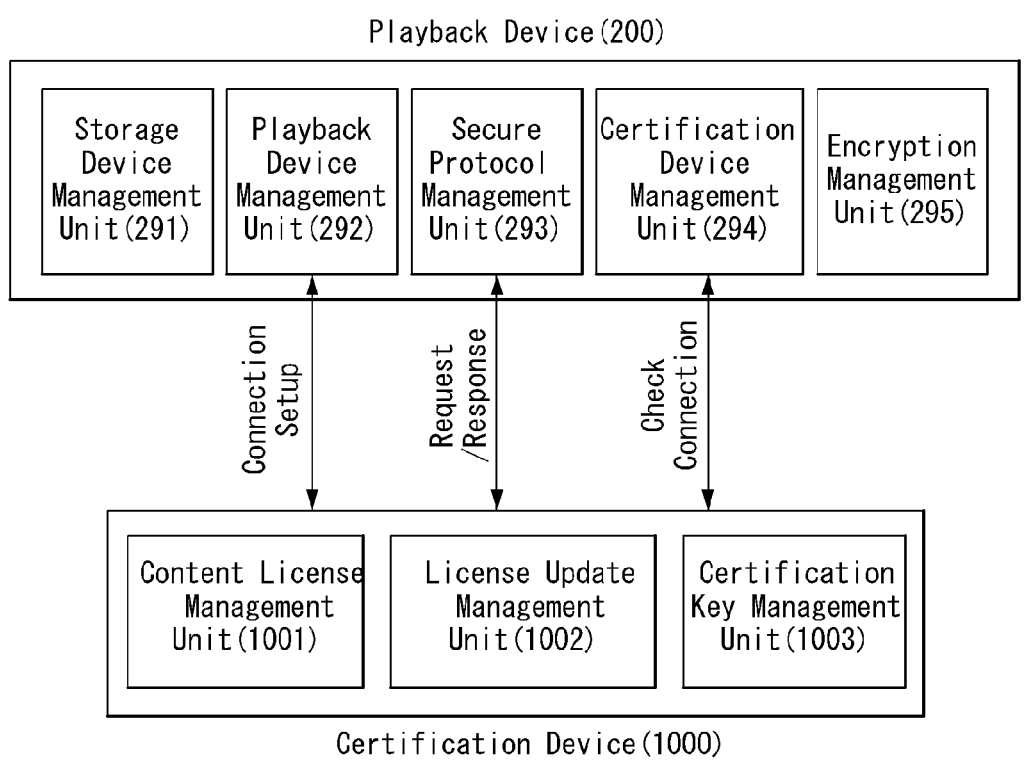
FIG. 27 is an internal block diagram of a certification device and a playback device for managing the right to play content according to an embodiment to which the present invention is applied.

FIG. 27 is an internal block diagram of a certification device and a playback device for managing the right to play content according to an embodiment to which the present invention is applied.

The playback device 200 and the certification device 1000 to which the present invention is applied may perform a connection setup so as to be connected to a network each other, and when the playback device 200 and the certification device 1000 are connected by the network, the playback device 200 and the certification device 1000 may transmit and receive a request message and a response message, and the playback device 200 and the certification device 1000 may continuously output content by periodically checking whether the network connection is maintained.

The playback device 200 may include a storage device management unit 291, a playback device management unit 292, a secure protocol management unit 293, a certification device management unit 294, and an encryption management unit 295.

The storage device management unit 291 may serve to detect connection and separation of a storage device, and provide a secure protocol command API.

The playback device management unit 292 may perform a control command such as playing or terminating content by interworking with a content license management unit, the secure protocol management unit 293, and the certification device management unit 294.

The secure protocol management unit 293 serves to process a secure protocol such as providing a license or providing the right to play.

The certification device management unit 294 may periodically check whether a connection between the playback device 200 and the certification device 1000 is maintained, and when the connection is cut off, the certification device management unit 294 may generate an event and transmit an event message to the playback device 200. In a case in which a plurality of certification devices are present, the certification device management unit 294 may generate a list for managing the plurality of certification devices.

The encryption management unit 295 may call an API of an encryption module and perform an encryption-related function.

The certification device 1000 may include a content license management unit 1001, a license update management unit 1002, and a certification key management unit 1003.

The content license management unit 1001 may manage a list of content having the right to use, and when a request for checking the right to play is received from the playback device 200, the content license management unit 1001 may transmit a content license list.

The license update management unit 1002 may check a change in a content license and update a certification key. For example, when the user purchases new content, the license update management unit 1002 may add the new content to the content list. Also, in a case in which an expiration date of content purchased by the user expires, the license update management unit 1002 may delete the corresponding from the content list of the content license management unit 1001.

The certification key management unit 1003 may serve to store and manage a certification key required when a protocol is applied between the playback device 200 and the storage device.

Figure 28:
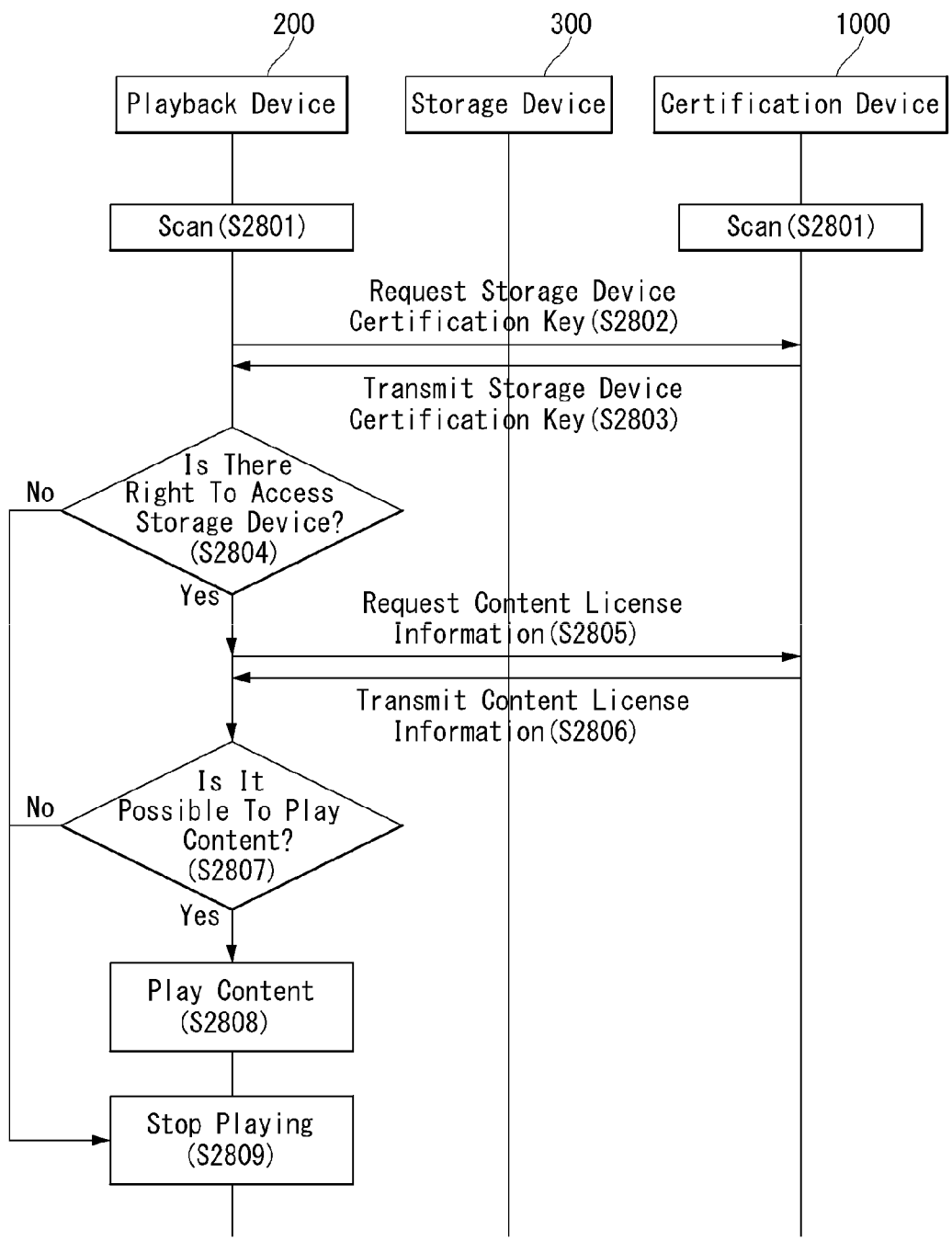
FIGS. 28 and 29 are flow charts illustrating a method for managing the right to play content between a playback device and a certification device according to embodiments to which the present invention is applied.
Figure 29:
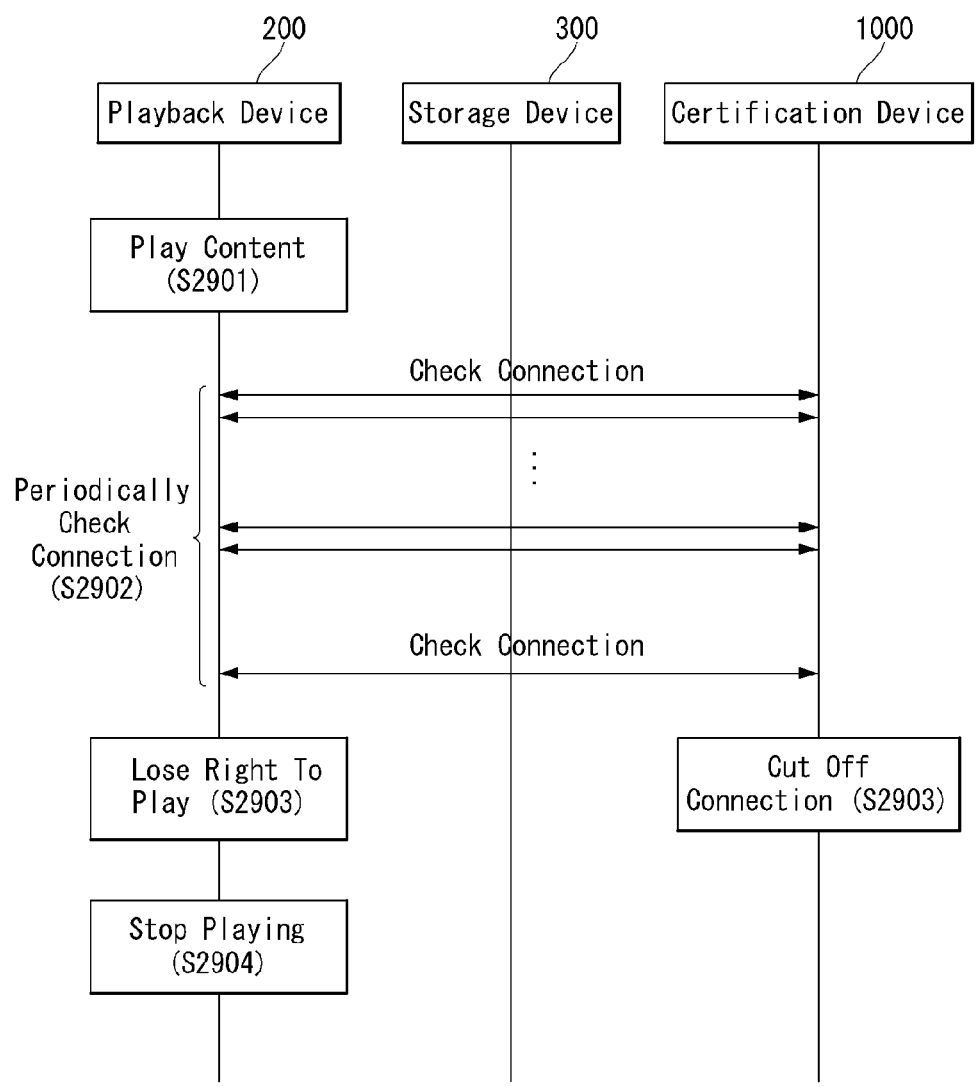

FIGS. 28 and 29 are flow charts illustrating a method for managing the right to play content between a playback device and a certification device according to embodiments to which the present invention is applied.

First, the playback device 200 may scan whether a certification device is present nearby by using near-field communication (NFC) (S2801). Similarly, the certification device 1000 may scan whether a playback device is present nearby by using NFC (S2801).

When mutual presence is checked according to the scan result, the playback device 200 and the certification device 1000 are connected using NFC.

The playback device 200 may request a certification key of the storage device 300 from the certification device 1000 (S2802).

According to the request for a certification key from the playback device 200, the certification device 1000 may check whether the certification key of the storage device 300 is present within the certification device 1000. When the certification key of the storage device 300 is present within the certification device 1000 according to the check result, the certification device 1000 may transmit the certification key to the playback device 200 (S2803).

The playback device 200 may check whether it has the right to access the storage device 300 (S2804).

When the playback device 200 does not have the right to access the storage device 300 according to the check result, the playback device 200 may not play content (S2809).

In contrast, when the playback device 200 has the right to access the storage device 300, the playback device 200 may request content license information from the certification device 1000 (S2805).

According to the request for the content license information from the playback device 200, the certification device 1000 may check whether the content license information is present within the certification device 1000. When the content license information is present within the certification device 1000 according to the check result, the certification device 1000 may transmit the content license information to the playback device 200 (S2806).

The playback device 200 may check whether it can play content on the basis of the received content license information (S2807).

When it is not possible to play the content, the playback device 200 cannot play the content (S2809), and when it is possible to play the content, the playback device 200 may play the content (S2808).

Referring to FIG. 29, in a case in which the playback device 200 plays content (S2901), the playback device 200 and the certification device 1000 may periodically check whether the connection therebetween is maintained (S2902).

When the network connection between the playback device 200 and the certification device 1000 is cut off, the playback device 200 may lose the right to play (S2903), and thus, playing the content is stopped (S2904). Meanwhile, in the case in which the network connection is cut off, connection of the certification device 1000 to the playback device is interrupted (S2903), and the certification device 1000 scans whether a connectable playback device is present nearby by using NFC again.

Figure 30:
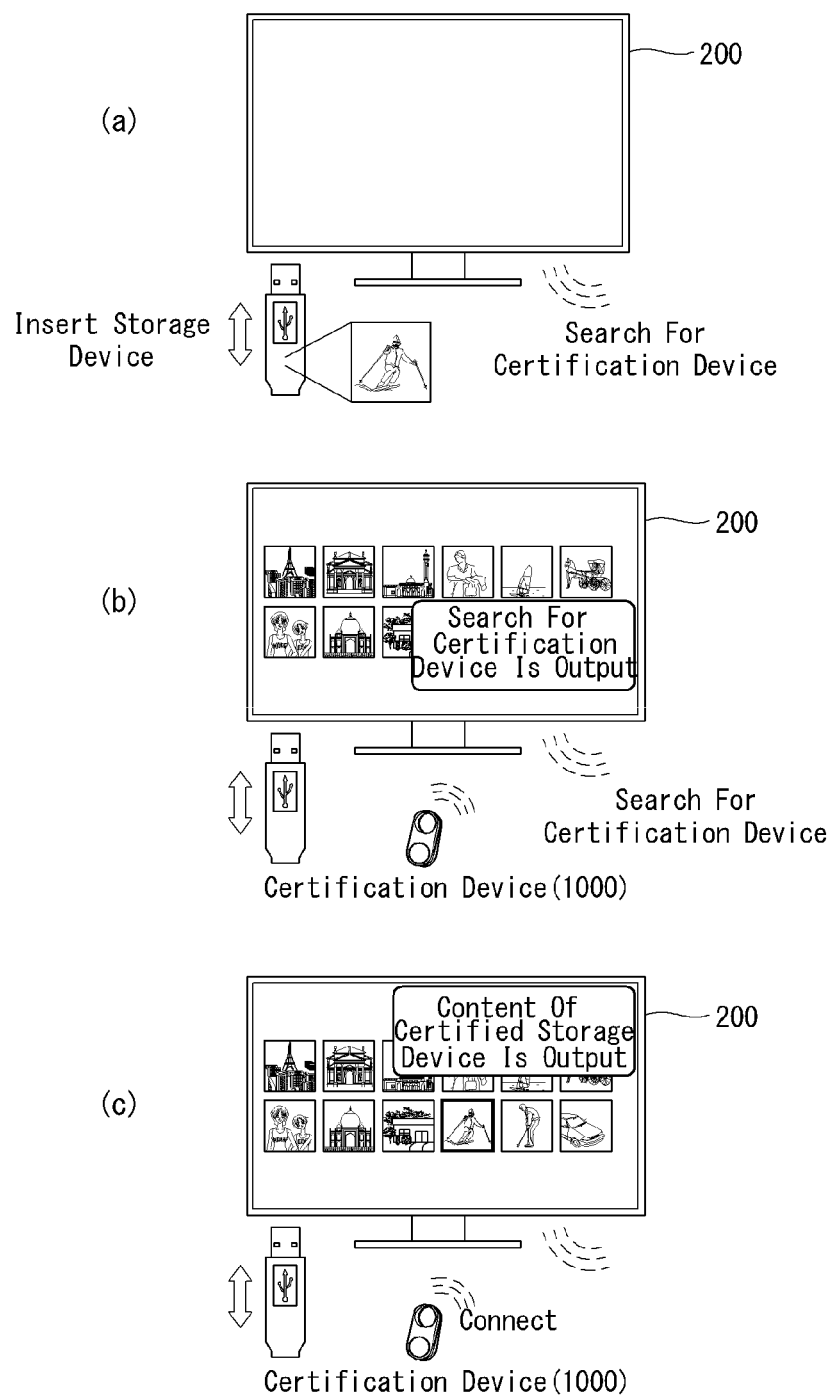
FIG. 30 is a view illustrating a process of playing content through near-field communication (NFC) between a playback device and a certification device according to an embodiment to which the present invention is applied.

FIG. 30 is a view illustrating a process of playing content through near-field communication (NFC) between a playback device and a certification device according to an embodiment to which the present invention is applied.

Referring to FIG. 30(*a*), when a storage device is connected to the playback device 200, the playback device 200 detects the connection of the storage device and recognizes content stored in the storage device. Also, the playback device 200 scans whether a certification device is present nearby by using NFC.

In FIG. 30(*b*), when the playback device 200 detects the presence of the certification device 1000 nearby, the playback device 200 may output the detected certification device 1000.

In FIG. 30(*c*), after the playback device 200 requests a certification key of the storage device 300 from the certification device 1000 and checks whether the playback device 200 has the right to access the storage device, the playback device 200 requests content license information and check whether it is possible to play the content. When it is possible to play the content according to the check result, the playback device 200 may output the content of the certified storage device.

Meanwhile, when the playback device 200 is playing the content, the playback device 200 and the certification device 1000 periodically check whether the connection therebetween is maintained, thereby playing the content ceaselessly.

INDUSTRIAL APPLICABILITY

While exemplary embodiments have been shown and described above, it will be apparent to those skilled in the art that modifications and variations could be made without departing from the scope of the present invention as defined by the appended claims.

The invention claimed is:

1. A method of playing content by a playback device, the method comprising:
    detecting whether a storage device is connected;
    transmitting transaction information to a license server, wherein the transaction information includes transaction identification information used for identifying a corresponding transaction and a user;
    transmitting, to the license server, certificate information of the storage device;
    transmitting, to the storage device, a certificate revision list received from the license server on the basis of the certificate information;
    obtaining license information allowing the content to be played through a first session established between the playback device and the storage device, the first session being identified by session identification information; and
    playing the content on the basis of the license information,
    wherein when the content is copied or moved to an unlicensed storage device by the user, only a data file of the content is transmitted and new license information is required to play the content, and
    wherein when the content is copied or moved to another storage device by the user, a certification unit checks whether a right to copy or move the content is present through a server, and a processor copies or moves the content to the another storage device when the right to copy or move the content is present.

2. The method of claim 1, further comprising:
receiving the content from an external server through a second session established between the storage device and the external server,
wherein the second session corresponds to a non-secure session.

3. The method of claim 2, further comprising:
receiving the content from an external server through a second session established between the storage device and the external server,
wherein the second session corresponds to the non-secure session.

4. The method of claim 3, wherein the first session identification information indicating the secure session is represented as 0x0001, and second session identification information indicating the non-secure session is represented as 0x0000.

5. The method of claim 1, wherein at least one of the content and the license information includes output control information related to an output control of the content, and
wherein the output control information includes HDCP (High-bandwidth Digital Content Protection) control information.

6. A playback device of playing a content, the playback device comprising:
a controller configured to:
detect whether a storage device is connected,
transmit transaction information to a license server, wherein the transaction information includes transaction identification information used for identifying a corresponding transaction and a user,
transmit, to a license server, certificate information of the storage device,
transmit, to the storage device, a certificate revision list received from the license server on the basis of the certificate information,
obtain license information allowing the content to be played through a first session established between the storage device and the license server, and
play the content on the basis of the license information; and
a display configured to output the content,
wherein the first session is identified by session identification information,
wherein when the content is copied or moved to an unlicensed storage device by the user, only a data file of the content is transmitted and new license information is required to play the content, and
where when the content is copied or moved to another storage device by the user, a certification unit checks whether a right to copy or move the content is present through a server, and a processor copies or moves the content to the another storage device when the right to copy or move the content is present.

7. The playback device of claim 6, wherein the session identification information indicates one of at least two types of session statuses, the at least two types of session statuses include a secure session and a non-session; and
wherein the first session corresponds to the secure session.

8. The playback device of claim 6, wherein at least one of the content and the license information includes output control information related to an output control of the content, and
wherein the output control information includes HDCP (High-bandwidth Digital Content Protection) control information.

* * * * *